United States Patent
Ishida et al.

(10) Patent No.: US 7,810,339 B2
(45) Date of Patent: Oct. 12, 2010

(54) AIR CONDITIONER AND METHOD OF CONTROLLING AIR CONDITIONER

(75) Inventors: Satoshi Ishida, Sakai (JP); Nobuki Matsui, Sakai (JP); Tomohiro Yabu, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 1058 days.

(21) Appl. No.: 10/593,441

(22) PCT Filed: Mar. 25, 2005

(86) PCT No.: PCT/JP2005/005511

§ 371 (c)(1),
(2), (4) Date: Sep. 19, 2006

(87) PCT Pub. No.: WO2005/098326

PCT Pub. Date: Oct. 20, 2005

(65) Prior Publication Data

US 2007/0193287 A1    Aug. 23, 2007

(30) Foreign Application Priority Data

Mar. 31, 2004  (JP)  ............................. 2004-104762
Mar. 31, 2004  (JP)  ............................. 2004-104765

(51) Int. Cl.
*F25B 13/00* (2006.01)
*F25B 49/04* (2006.01)
*F25B 17/00* (2006.01)

(52) U.S. Cl. ........................... 62/160; 62/228.1; 62/232

(58) Field of Classification Search ...................... 62/94, 62/159, 160, 228.1, 232, 480
See application file for complete search history.

(56) References Cited

U.S. PATENT DOCUMENTS

| 4,744,223 | A | 5/1988 | Umezu |
| 7,395,677 | B2 * | 7/2008 | Fujiyoshi et al. ........... 62/324.1 |
| 2007/0180851 | A1 * | 8/2007 | Fujiyoshi et al. .............. 62/480 |
| 2009/0134231 | A1 * | 5/2009 | Matsui ..................... 236/44 A |
| 2009/0230202 | A1 * | 9/2009 | Matsui et al. ............. 236/44 A |

FOREIGN PATENT DOCUMENTS

| EP | 1 450 113 A1 | 8/2004 |
| JP | 62-129639 A | 6/1987 |
| JP | 08-178399 A | 7/1996 |
| JP | 09-318128 A | 12/1997 |
| JP | 10-009633 A | 1/1998 |
| JP | 10-054586 A | 2/1998 |
| JP | 2000-314540 A | 11/2000 |

(Continued)

*Primary Examiner*—Marc E Norman
(74) *Attorney, Agent, or Firm*—Global IP Counselors

(57) ABSTRACT

An air conditioner has a heat exchanger, an absorbing agent, and a controller. The absorbing agent performs an absorbing operation for absorbing moisture in passing air flowing through the heat exchanger functioning as an evaporator and a regenerating operation for desorbing moisture from passing air heated by the heat exchanger functioning as a condenser. The controller performs control such that the absorbing operation and the regenerating operation are switched at a predetermined switching time interval. The controller also performs control of a capacity of a compressor and control for changing the predetermined switching time interval such that a predetermined load out of a total heat load, which is the sum of the latent heat load and the sensible heat load, is preferentially processed.

13 Claims, 15 Drawing Sheets

FOREIGN PATENT DOCUMENTS

| | | |
|---|---|---|
| JP | 2002-022245 A | 1/2002 |
| JP | 2003-028458 A | 1/2003 |
| JP | 2003-161465 A | 6/2003 |
| JP | 2004-060954 A | 2/2004 |
| WO | WO-03-046441 A1 | 6/2003 |

* cited by examiner

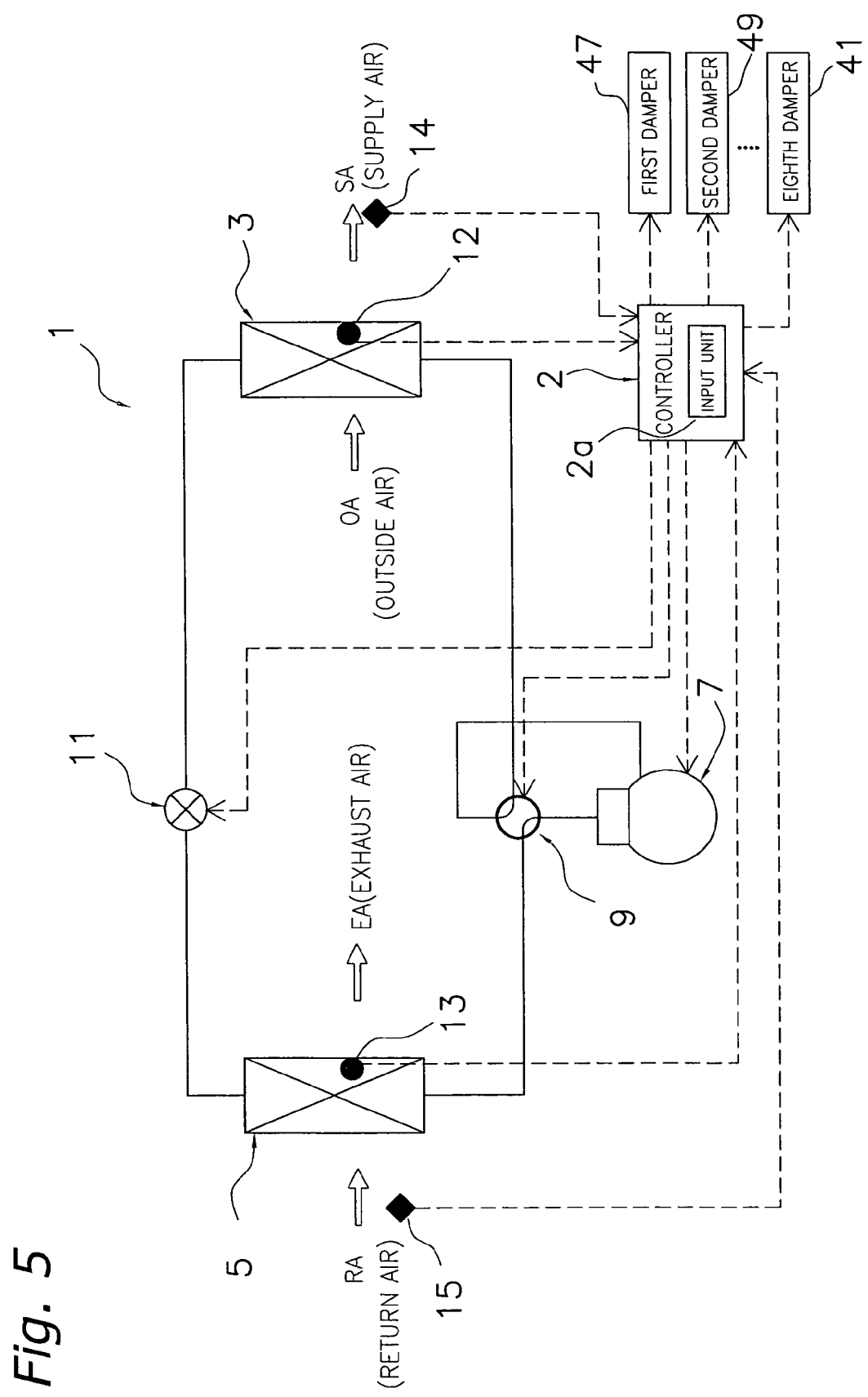

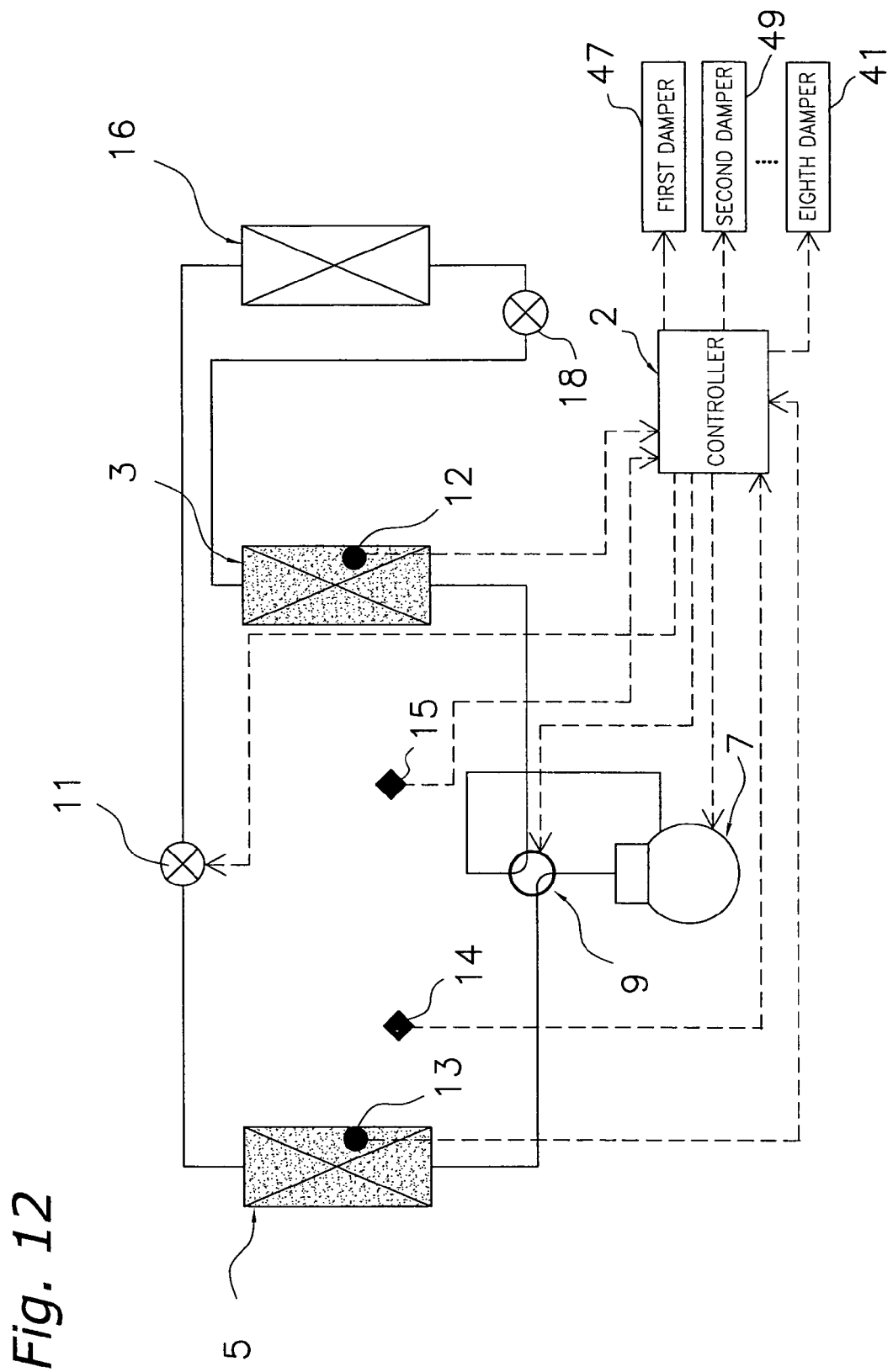

HUMIDIFYING OPERATION
(SECOND OPERATION)

HUMIDIFYING OPERATION
(FIRST OPERATION)

AIR CONDITIONER AND METHOD OF CONTROLLING AIR CONDITIONER

CROSS-REFERENCE TO RELATED APPLICATIONS

This U.S. National stage application claims priority under 35 U.S.C. §119(a) to Japanese Patent Application Nos. 2004-104762, filed in Japan on Mar. 31, 2004, and 2004-104765, filed in Japan on Mar. 31, 2004, the entire contents of which are hereby incorporated herein by reference.

TECHNICAL FIELD

The present invention relates to an air conditioner and a method of controlling an air conditioner, and in particular to an air conditioner that processes a latent heat load and a sensible heat load in a room by using a vapor compression refrigeration cycle with a compressor.

BACKGROUND ART

Conventionally, an air conditioner that enables the regulation of the humidity of air using an absorbing agent has been known as a desiccant humidity controller and a desiccant outdoor air conditioning unit. For example, the air conditioning system described in Japanese Patent Publication No. 10-9633 is disposed with two desiccants (absorbing agents) and performs an absorbing operation and a regeneration operation with each desiccant in batches. The air conditioning system also performs dehumidifying air conditioning in a room by repeatedly performing regeneration of the first desiccant and dehumidification of process air by the second desiccant, and dehumidification of process air by the first desiccant and regeneration of the second desiccant, for example.

The humidity controller described in Japanese Patent Publication No. 2004-60954 also performs a dehumidifying operation or a humidifying operation by alternately switching between a first operation, where an absorbing operation is performed by a first absorbing element (a unit including an absorbing agent) and a regenerating operation is performed by a second absorbing element, and a second operation, where an absorbing operation is performed by the second absorbing element and a regenerating operation is performed by the first absorbing element, and supplying first air of the absorbing side or second air of the regenerating side to a room.

Further, the following methods have been proposed in regard to controlling the capability of the dehumidifying and humidifying operations of a desiccant-type outdoor air conditioning unit using a conventional absorbing agent.

(1) As a control method that uniformly regulates the temperature of regeneration air, a method of controlling the operation of a heat pump that serves as a heat source for regenerating the desiccant on the basis of the humidity and temperature of an air-conditioned space is described in Japanese Patent Publication No. 9-318128.

(2) As a control method resulting from deciding the temperature of regeneration air from a set value and a measured value of indoor air humidity or supply air humidity, a method of performing capability control using means which controls the moisture absorption rate of the desiccant in a process air path and means which accelerates a rise in the temperature of the regeneration air in a regeneration air path is described in Japanese Patent Publication No. 10-54586.

The means which accelerates a rise in temperature of the regeneration air raises the temperature of the regeneration air by reducing the flow volume of the regeneration air in the path of the regeneration air, and raises the temperature of the regeneration air using auxiliary heating means disposed upstream of the desiccant in the regeneration air path. The means which controls the absorption rate controls the moisture absorption rate by stopping the circulation of the process air in the process air path and controls the moisture absorption rate by causing the process air to circulate in a bypass path that bypasses the process air from downstream of the desiccant disposed in the process air path to upstream.

Moreover, as another control method in regard to the capability of the dehumidifying and humidifying operations, a method resulting from supply and exhaust air flow volume balance control is also conceivable.

SUMMARY OF THE INVENTION

The above-described conventional air conditioners that use an absorbing agent switch between the operation of absorbing moisture in air by the absorbing agent and the regenerating operation for desorbing the moisture from the absorbing agent, but conventionally, no particularly remarkable technique has been employed in regard to controlling that switching. It is thought that it is necessary to conduct switching at appropriate time intervals because, when the time intervals of the switching are too long, the absorbing action of the absorbing agent approaches a limit and the absorbing agent becomes unable to sufficiently absorb the moisture, yet it is thought that by determining appropriate time intervals, controlling the capacity of the compressor is the control method that is ordinarily considered in regard to the capability of dehumidification/humidification.

Further, in an air conditioner that processes a latent heat load and a sensible heat load, remarkable technology does not really exist in regard to what kind of capability control is preferable for the air conditioner to perform.

It is an object of the present invention to provide an air conditioner, and a method of controlling an air conditioner, that processes a latent heat load and a sensible heat load in a room and can perform appropriate capability control.

Control of the capability of the dehumidifying and humidifying operations of a conventional desiccant-type outdoor air conditioning unit such as in Japanese Patent Publication Nos. 9-318128 and 10-54586—for example, capability control whose control target is air temperature—is possible in a flow-type dehumidifying/humidifying system, but is not suited to a batch-type dehumidifying/humidifying system for the reasons that temporal delays of air temperature changes with respect to changes in the operating state such as during batch switching are large, and the temperature distribution (also including changes over time) of each part in the flow path is large.

It is another object of the present invention to provide an air conditioner, and a method of controlling an air conditioner, that enables appropriate control of the capability of the air conditioner and/or the sensible/latent heat throughput ratio.

An air conditioner pertaining to a first aspect of the present invention processes a latent heat load and a sensible heat load by using a vapor compression refrigeration cycle with a compressor and has a heat exchanger, an absorbing agent, and a controller. The absorbing agent performs an absorbing operation for absorbing moisture in passing air whose heat has been absorbed by the heat exchanger functioning as an evaporator and a regenerating operation for desorbing moisture from passing air heated by the heat exchanger functioning as a condenser. The controller performs control such that the absorbing operation and the regenerating operation by the absorbing agent are switched at a predetermined switching time interval. The controller also performs control of the capacity of the compressor and control for changing the switching time interval between the absorbing operation and the regenerating operation such that a predetermined load out of a total heat load, which is the sum of the latent heat load and the sensible heat load, the latent heat load, and the sensible heat load is preferentially processed.

Here, the absorbing agent performs the absorbing operation by the heat exchanger functioning as an evaporator, and the absorbing agent performs the regenerating operation by the heat exchanger functioning as a condenser. The control for changing the time interval of the switching between the absorbing operation and the regenerating operation by the absorbing agent (switching time interval) is performed by the controller together with the control of the capacity of the compressor.

By changing the switching time interval, the controller can change the ratio of the capability to process the latent heat load of the air conditioner (called the "latent heat processing capability" below) to the capability to process the sensible heat load (called the "sensible heat processing capability" below). By performing control of the capacity of the compressor, the controller can increase/decrease the sum of the latent heat processing capability and the sensible heat processing capability (called the "total heat processing capability" below). That is, the controller regulates the latent heat processing capability, the sensible heat processing capability, and the total heat processing capability.

The controller having this regulating function performs control of the capacity of the compressor and control for changing the switching time interval such that a predetermined load out of the total heat load, the latent heat load, and the sensible heat load is preferentially processed. Because such control is performed, it becomes easy for the air conditioner to perform appropriate capability control.

For example, when the predetermined load that is to be preferentially processed is one that has been selected by a user, as in the air conditioner pertaining to a second aspect of the present invention, the selected load is preferentially processed, and an air-conditioner environment that is more suited to the liking of the user can be obtained.

Further, when the predetermined load that is to be preferentially processed is decided on the basis of the difference between the latent heat processing capability and the size of the latent heat processing, the difference between the sensible heat processing capability and the size of the sensible heat processing, and the difference between the total heat processing capability and the size of the total heat processing, as in the air conditioner pertaining to a third aspect of the present invention, the load whose difference is the greatest is preferentially processed as the predetermined load, and balance of the processing of the total heat load, the latent heat load, and the sensible heat load can be achieved.

An air conditioner pertaining to the second aspect of the present invention comprises the air conditioner of the first aspect of the present invention and further comprises an input unit that allows a user to select the predetermined load.

An air conditioner pertaining to the third aspect of the present invention comprises the air conditioner of the first aspect of the present invention, wherein the controller decides the predetermined load to be preferentially processed on the basis of a first difference, a second difference, and a third difference. The first difference is a difference between the current capability to process the total heat load and the size of the total heat load. The second difference is a difference between the current capability to process the latent heat load and the size of the latent heat load. The third difference is a difference between the current capability to process the sensible heat load and the size of the sensible heat load.

An air conditioner pertaining to a fourth aspect of the present invention comprises the air conditioner of any of the first to the third aspects of the present invention, wherein the controller prioritizes changing the throughput of the latent heat load by controlling the capacity of the compressor over changing the throughput of the latent heat load by control for changing the switching time interval when the predetermined load is the latent heat load.

Here, when the latent heat load is to be preferentially processed, the controller first performs control of the capacity of the compressor to change the throughput of the latent heat load, and when that does not suffice, the controller performs control for changing the switching time interval between the absorbing operation and the regenerating operation to further change the throughput of the latent heat load. In this manner, because the controller first performs control of the capacity of the compressor, changes in the throughput of the latent heat load appear relatively quickly, and necessary processing of the latent heat load is quickly achieved.

An air conditioner pertaining to a fifth aspect of the present invention comprises the air conditioner of any of the first to the third aspects of the present invention, wherein the controller prioritizes changing the throughput of the latent heat load by control for changing the switching time interval over changing the throughput of the latent heat load by controlling the capacity of the compressor when the predetermined load is the latent heat load.

Here, when the latent heat load is to be preferentially processed, the controller first performs control for changing the switching time interval between the absorbing operation and the regenerating operation to change the throughput of the latent heat load, and when that does not suffice, the controller performs control of the capacity of the compressor to further change the throughput of the latent heat load. In this manner, because the controller first performs control for changing the switching time interval, the controller can increase the throughput of the latent heat load, without having to significantly increase the amount of energy consumption by control for raising the capacity of the compressor, even when it is necessary to increase the throughput of the latent heat load. For example, it is not necessary to raise the capacity of the compressor when the necessary throughput of the latent heat load can be ensured by increasing the ratio of the throughput of the latent heat load to the throughput of the sensible heat load by performing control for changing the switching time interval.

An air conditioner pertaining to a sixth aspect of the present invention comprises the air conditioner of any of the first to the third aspects of the present invention, wherein the controller prioritizes changing the throughput of the sensible heat load by controlling the capacity of the compressor over changing the throughput of the sensible heat load by control for changing the switching time interval when the predetermined load is the sensible heat load.

Here, when the sensible heat load is to be preferentially processed, the controller first performs control of the capacity of the compressor to change the throughput of the sensible heat load, and when that does not suffice, the controller performs control for changing the switching time interval between the absorbing operation and the regenerating operation to further change the throughput of the sensible heat load. In this manner, because the controller first performs control of the capacity of the compressor, changes in the throughput of the sensible heat load appear relatively quickly, and necessary processing of the sensible heat load is quickly achieved.

An air conditioner pertaining to a seventh aspect of the present invention comprises the air conditioner of any of the first to the third aspects of the present invention, wherein the controller prioritizes changing the throughput of the sensible heat load by control for changing the switching time interval over changing the throughput of the sensible heat load by controlling the capacity of the compressor when the predetermined load is the sensible heat load.

Here, when the sensible heat load is to be preferentially processed, the controller first performs control for changing the switching time interval between the absorbing operation and the regenerating operation to change the throughput of the sensible heat load, and when that does not suffice, the controller performs control of the capacity of the compressor to further change the throughput of the sensible heat load. In this manner, because the controller first performs control for changing the switching time interval, the controller can increase the throughput of the sensible heat load, without having to significantly increase the amount of energy consumption by control for raising the capacity of the compressor, even when it is necessary to increase the throughput of the sensible heat load. For example, it is not necessary to raise the capacity of the compressor when the necessary throughput of the sensible heat load can be ensured by increasing the ratio of the throughput of the sensible heat load to the throughput of the latent heat load by performing control for changing the switching time interval.

An air conditioner pertaining to an eighth aspect of the present invention comprises the air conditioner of any of the first to the third aspects of the present invention, wherein the controller first performs control of the capacity of the compressor when the predetermined load is the total heat load.

Because changing the capacity of the compressor is effective when the total heat load is to be increased/decreased, here, the controller first performs control of the capacity of the compressor when the total heat load must be preferentially processed.

An air conditioner pertaining to a ninth aspect of the present invention comprises the air conditioner of any of the first to the third aspects of the present invention, wherein the controller first fixes the ratio of the throughput of the latent heat load to the throughput of the sensible heat load by controlling the switching time interval and thereafter performs control of the capacity of the compressor when the predetermined load is the total heat load.

Because it is basically not necessary to change the sensible/latent heat throughput ratio when the total heat load is to be prioritized, here, the controller first fixes the sensible/latent heat throughput ratio and performs control of the capacity of the compressor. For this reason, unnecessary changes in the sensible/latent heat throughput ratio are controlled.

This will be described more specifically. When the sensible/latent heat throughput ratio is regulated in accordance with the ratio of the sensible/latent heat load of the total heat load in an air conditioner of a format that switches between an absorbing operation and a regenerating operation by an absorbing agent, there is the potential for the capability control to become needlessly complicated. However, here, the controller first changes the throughput of the total heat load, and can change the throughput of the remaining sensible heat load or latent heat load by regulating the sensible/latent heat load ratio from the point in time when the sensible heat or latent heat load and the sensible heat or latent heat throughput are to a certain extent in equilibrium, so that the control can be simplified.

An air conditioner pertaining to a tenth aspect of the present invention comprises the air conditioner of any of the first to the ninth aspects of the present invention, wherein the air conditioner includes, as the heat exchanger, a first absorptive heat exchanger and a second absorptive heat exchanger on whose surfaces the absorbing agent is disposed. Additionally, the controller switches between a first state and a second state. In the first state, the air conditioner supplies, to the room, air that has been dehumidified or humidified by the absorbing operation or the regenerating operation by the absorbing agent of the first absorptive heat exchanger. In the second state, the air conditioner supplies, to the room, air that has been dehumidified or humidified by the absorbing operation or the regenerating operation by the absorbing agent of the second absorptive heat exchanger.

This air conditioner includes two absorptive heat exchangers as the heat exchanger and switches between the state where the air conditioner supplies, to the room, air that has been dehumidified or humidified from one of the absorptive heat exchangers (the first state) and the state where the air conditioner supplies, to the room, air that has been dehumidified or humidified from the other of the absorptive heat exchangers (the second state). In this manner, because the air conditioner includes two absorptive heat exchangers, the air conditioner can cause the absorbing agent of one of the absorptive heat exchangers to perform the absorbing operation and cause the absorbing agent of the other of the absorptive heat exchangers to perform the regenerating operation, so that it becomes possible for the air conditioner to continuously send air that has been dehumidified or humidified into the room.

An air conditioner pertaining to an eleventh aspect of the present invention comprises the air conditioner of any of the first to the tenth aspects of the present invention, wherein the air conditioner includes the heat exchanger as a utilization heat exchanger. This air conditioner further comprises a heat source heat exchanger separate from the utilization heat exchanger.

Here, the air conditioner further comprises the heat source heat exchanger separate from the utilization heat exchanger that causes the absorbing agent to perform the absorbing operation and the regenerating operation.

It will be noted that the air conditioner can also be equipped with plural heat exchangers that cause the absorbing agent to perform the absorbing operation and the regenerating operation as utilization heat exchangers. Further, the air conditioner can also be equipped with a heat exchanger that causes the absorbing agent to perform the absorbing operation and the regenerating operation and a heat exchanger dedicated to sensible heat processing separate from that as utilization heat exchangers.

An air conditioner pertaining to a twelfth aspect of the present invention comprises the air conditioner of any of the first to the eleventh aspects of the present invention, wherein the controller performs the control of the capacity of the compressor and the control for changing the switching time interval on the basis of at least any one of the temperature of the evaporator, the pressure of the evaporator, the temperature of the condenser, and the pressure of the condenser.

Here, the state of the refrigerant in the heat exchanger can be obtained from the temperature and pressure of the heat exchanger (the temperature of the evaporator, the pressure of the evaporator, the temperature of the condenser, the pressure of the condenser) causing the absorbing agent to perform the absorbing operation and the regenerating operation. This state of the refrigerant is the factor that greatly affects the temperature of the absorbing agent. Here, because the absorbing operation and the regenerating operation by the absorbing agent are switched at the predetermined switching time interval, it is difficult to ensure estimated precision when the temperature of the absorbing agent is estimated from just the temperature and humidity of around the heat exchanger and the absorbing agent.

In light of this, the controller performs control of the capacity of the compressor and control for changing the switching time interval on the basis of at least any one of the pressure of the evaporator, the temperature of the condenser, and the pressure of the condenser, which have a strong relationship with the temperature of the absorbing agent that has a direct impact on the capability to process the latent heat load and the capability to process the sensible heat load, and particularly the capability to process the latent heat load. Thus, capability control (control of the capacity of the compressor and control for changing the switching time interval) when the air conditioner performs a cooling and dehumidifying operation and a heating and humidifying operation is more appropriately performed.

A method of controlling an air conditioner pertaining to a thirteenth aspect of the present invention is a method of controlling an air conditioner that processes a latent heat load and a sensible heat load in a room by using a vapor compression refrigeration cycle with a compressor and a heat exchanger and using an absorbing agent that performs an absorbing operation and a regenerating operation. The absorbing operation by the absorbing agent refers to an operation for absorbing moisture in passing air whose heat has been absorbed by the heat exchanger functioning as an evaporator. The regenerating operation refers to an operation for desorbing moisture from passing air heated by the heat exchanger functioning as a condenser. This method of controlling an air conditioner comprises performing control such that the absorbing operation and the regenerating operation by the absorbing agent are switched at a predetermined switching time interval, and performing control of the capacity of the compressor and control for changing the switching time interval such that a predetermined load out of a total heat load, which is the sum of the latent heat load and the sensible heat load, the latent heat load, and the sensible heat load is preferentially processed.

An air conditioner of a fourteenth aspect of the present invention is an air conditioner that processes a latent heat load and a sensible heat load in a room by using a vapor compression refrigeration cycle with a compressor. The air conditioner comprises a heat exchanger, an absorbing agent, and a controller. The absorbing agent performs an absorbing operation for absorbing moisture in passing air whose heat has been absorbed by the heat exchanger functioning as an evaporator and a regenerating operation for desorbing moisture from passing air heated by the heat exchanger functioning as a condenser. The controller performs control such that the absorbing operation and the regenerating operation by the absorbing agent are switched at a predetermined switching time interval. The controller performs control of the capacity of the compressor and/or control for changing the switching time interval on the basis of at least any one of the temperature of the evaporator, the pressure of the evaporator, the temperature of the condenser, and the pressure of the condenser.

Here, given that the temperature of the absorbing agent follows the refrigerant temperature more than the air temperature, the controller performs control of the capacity of the compressor and/or control for changing the switching time interval on the basis of at least any one of the temperature of the evaporator, the pressure of the evaporator, the temperature of the condenser, and the pressure of the condenser, instead of the conventional regeneration air temperature or the like. Thus, more appropriate latent heat capability control (control of the amount of dehumidified/humidified water) during dehumidification/humidification and control of the sensible/latent heat throughput ratio during dehumidification/humidification become possible.

An air conditioner of a fifteenth aspect of the present invention comprises the air conditioner of the fourteenth aspect of the present invention, wherein the heat exchanger is an absorptive heat exchanger that carries the absorbing agent on its surface. Here, the heat exchanger carries the absorbing agent on its surface, so the temperature of the absorbing agent becomes extremely strongly linked to the refrigerant temperature. Consequently, performing control of the capacity of the compressor and/or control for changing the switching time interval on the basis of at least any one of the temperature of the evaporator, the pressure of the evaporator, the temperature of the condenser, and the pressure of the condenser becomes extremely effective. Thus, more appropriate latent heat capability control during dehumidification/humidification and control of the sensible/latent heat throughput ratio during dehumidification/humidification become possible.

An air conditioner of a sixteenth aspect of the present invention comprises the air conditioner of the fourteenth or the fifteenth aspect of the present invention, wherein the air conditioner includes the heat exchanger as a utilization heat exchanger and further comprises a heat source heat exchanger. Here, because the air conditioner further comprises a heat source heat exchanger, this is preferable in terms of processing the sensible heat load.

An air conditioner of a seventeenth aspect of the present invention comprises the air conditioner of any of the fourteenth to the sixteenth aspects of the present invention, wherein the controller performs the control of the capacity of the compressor and/or the control for changing the switching time interval also on the basis of the humidity of the air in the room. Here, the controller can more appropriately perform control of the capability of the air conditioner.

An air conditioner of an eighteenth aspect of the present invention comprises the air conditioner of any of the fourteenth to the seventeenth inventions aspects of the present invention, wherein the controller performs the control of the capacity of the compressor and/or the control for changing the switching time interval also on the basis of the humidity of the air flowing into the room from the heat exchanger. Here, the controller can more appropriately perform control of the capability of the air conditioner.

An air conditioner of a nineteenth aspect of the present invention comprises the air conditioner of any of the fourteenth to the eighteenth in aspects of the present invention, wherein the controller performs the control of the capacity of the compressor and/or the control for changing the switching time interval also on the basis of the temperature of the air flowing into the room from the heat exchanger. Here, the controller can more appropriately perform control of the capability of the air conditioner.

A method of controlling an air conditioner of a twentieth aspect of the present invention uses a vapor compression refrigeration cycle with a compressor and a heat exchanger. The air conditioner uses an absorbing agent that can perform an absorbing operation for absorbing moisture in passing air whose heat has been absorbed by the heat exchanger functioning as an evaporator and a regenerating operation for desorbing moisture from passing air heated by the heat exchanger functioning as a condenser. The air conditioner processes a latent heat load and a sensible heat load in a room. The method comprises performing control to switch the absorbing operation and the regenerating operation by the absorbing agent at a predetermined switching time interval, and performing control of the capacity of the compressor and/or control for changing the switching time interval on the basis of any one of the temperature of the evaporator, the pressure of the evaporator, the temperature of the condenser, and the pressure of the condenser.

Here, given that the temperature of the absorbing agent follows the refrigerant temperature more than the air temperature, the method performs control of the capacity of the compressor and/or control for changing the switching time interval on the basis of at least any one of the temperature of the evaporator, the pressure of the evaporator, the temperature of the condenser, and the pressure of the condenser, instead of the conventional regeneration air temperature or the like. Thus, more appropriate latent heat capability control (control of the amount of dehumidified/humidified water) during dehumidification/humidification and control of the sensible/latent heat throughput ratio during dehumidification/humidification become possible.

BRIEF DESCRIPTION OF THE DRAWINGS

FIG. 5 is a block diagram showing the state of a cooling and dehumidifying ventilation operation in the air conditioner.

FIG. 12 is a schematic block diagram of an air conditioner pertaining to another embodiment (2) of the present invention.

FIG. 13 (B) is a diagram showing a second state of the humidifying operation in the air conditioner pertaining to another embodiment (3) of the present invention.

BEST MODES FOR IMPLEMENTING DETAILED DESCRIPTION OF THE INVENTION

Basic Configuration of Air Conditioner 10

Figure 1:
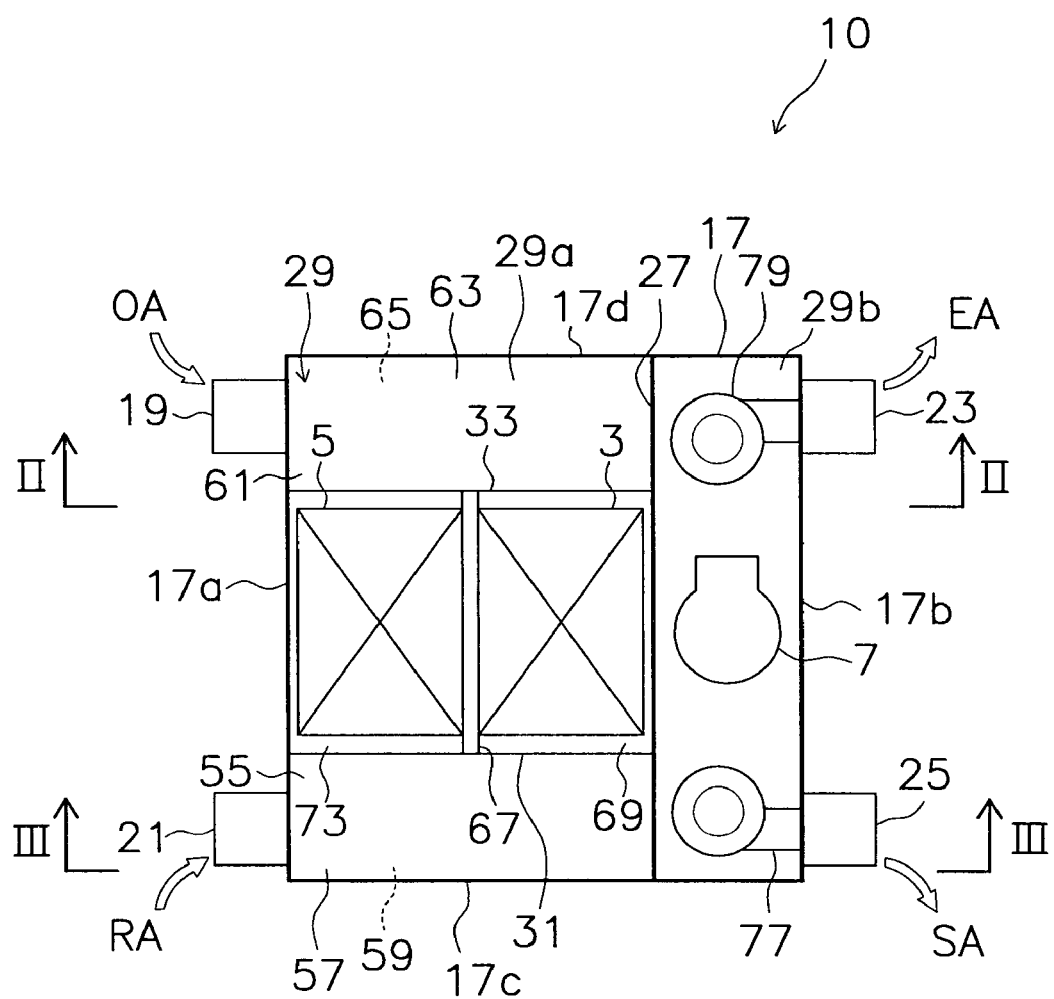
FIG. 1 is a plan view showing the internal structure of an air conditioner pertaining to an embodiment of the present invention.

As shown in FIGS. 1 to 4, an air conditioner 10 of the present embodiment is a desiccant-type outdoor air conditioning unit that carries an absorbing agent such as silica gel on the surface of heat exchangers, performs a cooling and dehumidifying operation and a heating and humidifying operation with respect to air supplied to an indoor space, and is disposed with a hollow, rectangular parallelepiped casing 17. A refrigerant circuit 1 and the like are housed in the casing 17.

As shown in FIG. 4, the refrigerant circuit 1 is configured as a closed circuit in which an inverter compressor 7 whose frequency can be changed, a four-way switch valve 9, a first absorptive heat exchanger 3, an expansion valve 11 such as an electrically powered valve, and a second absorptive heat exchanger 5 are connected in order. The first absorptive heat exchanger 3 and the second absorptive heat exchanger 5 function as one of a condenser and an evaporator as a result of a flow path of refrigerant being switched by the four-way switch valve 9.

Moreover, the entire refrigerant circuit 1 is filled with refrigerant, and the refrigerant circuit 1 is configured such that the refrigerant circulates to conduct a vapor compression refrigeration cycle.

One end of the first absorptive heat exchanger 3 is connected to the four-way switch valve 9. The other end of the first absorptive heat exchanger 3 is connected to one end of the second absorptive heat exchanger 5 via the expansion valve 11. The other end of the second absorptive heat exchanger 5 is connected to the four-way switch valve 9.

<Configuration of Absorptive Heat Exchangers and Absorbing Agent>

Figure 2:
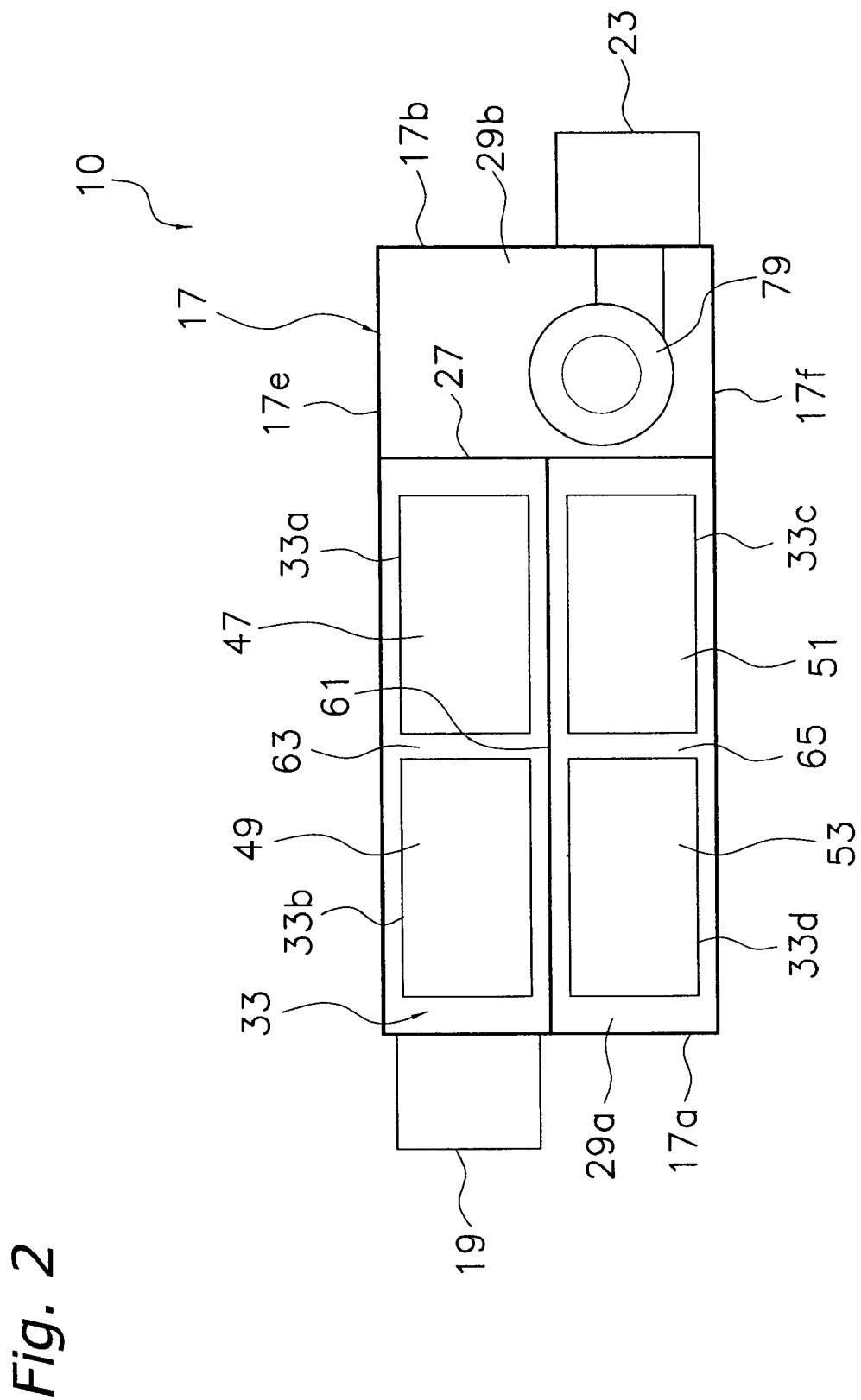
FIG. 2 is a cross-sectional view along arrow II-II of FIG. 1.
Figure 3:
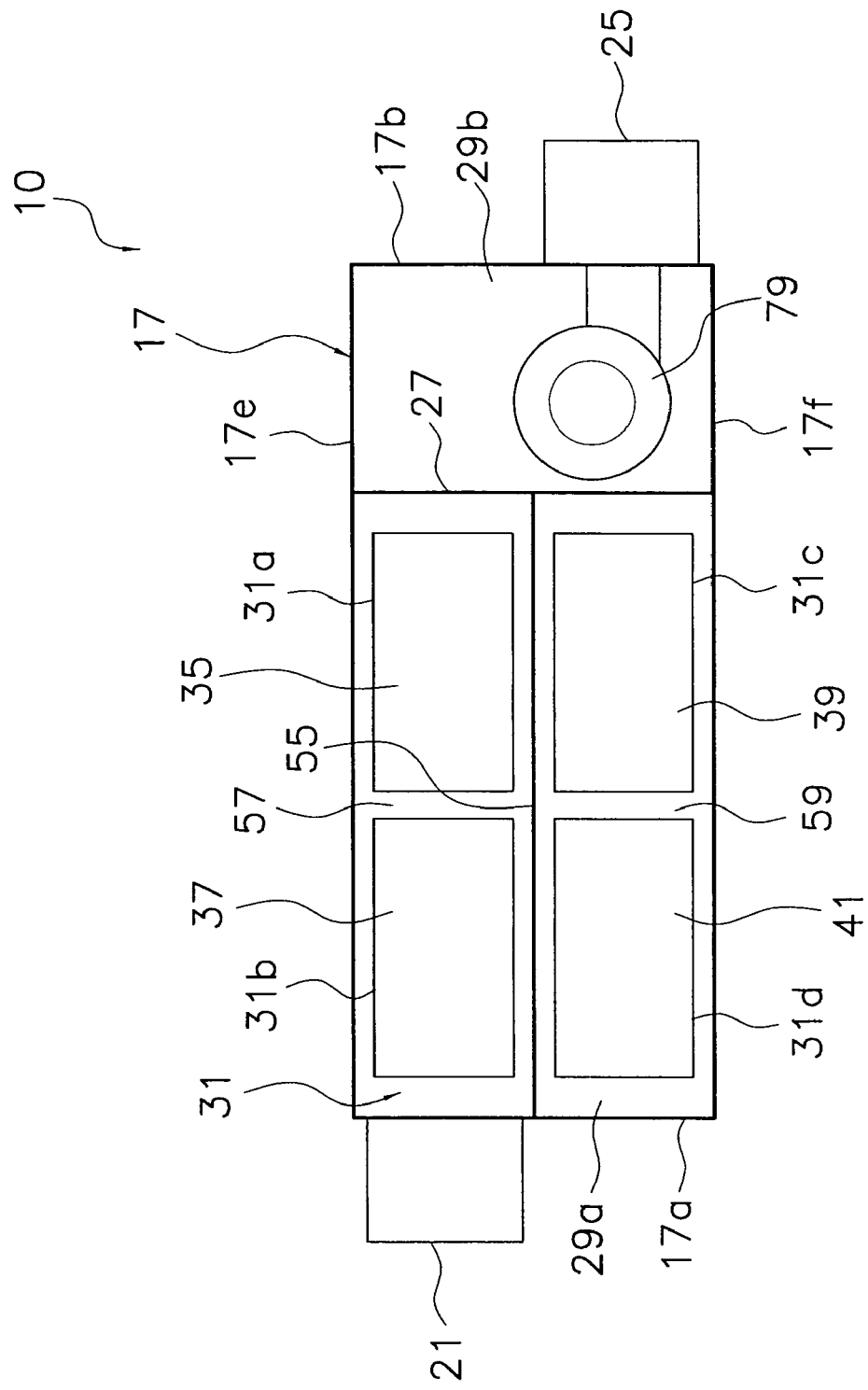
FIG. 3 is a cross-sectional view along arrow III-III of FIG. 1.

As shown in FIGS. 1 to 3, the first absorptive heat exchanger 3 and the second absorptive heat exchanger 5 are configured by cross-fin type fin-and-tube heat exchangers, for example, and specifically include numerous fins made of aluminum formed in rectangular plate shapes and a heat exchange tube that is made of copper and penetrates the fins. An absorbing agent is carried on the outer surfaces of the fins and the heat exchange tube. As the absorbing agent, zeolite, silica gel, activated carbon, hydrophilic or water-absorbing organic polymer material, ion-exchanging resin material including a carboxylic acid group or a sulfonic acid group, and functional polymer material such as a temperature-sensitive polymer can be employed.

<Configuration of Compressor>

Here, an inverter compressor is employed as the compressor whose frequency can be changed. The capacity of the inverter compressor can be controlled (control of the output) by changing the frequency of the inverter compressor.

<Configuration of Four-Way Switch Valve>

Figure 4B:
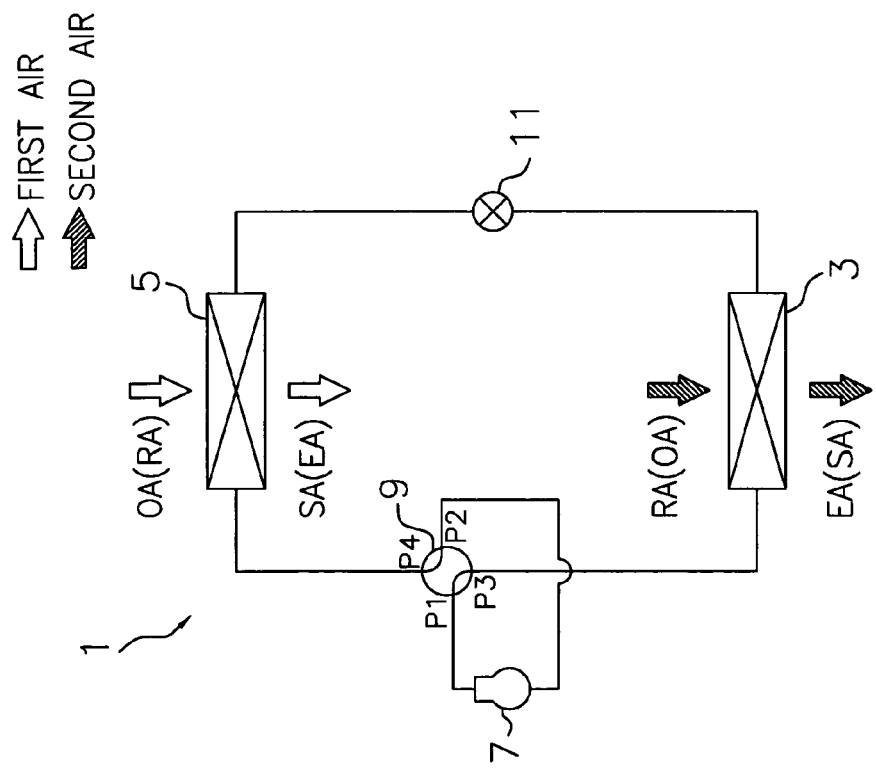
FIG. 4 shows circuit diagrams showing a refrigerant circuit of the air conditioner.
Figure 4A:
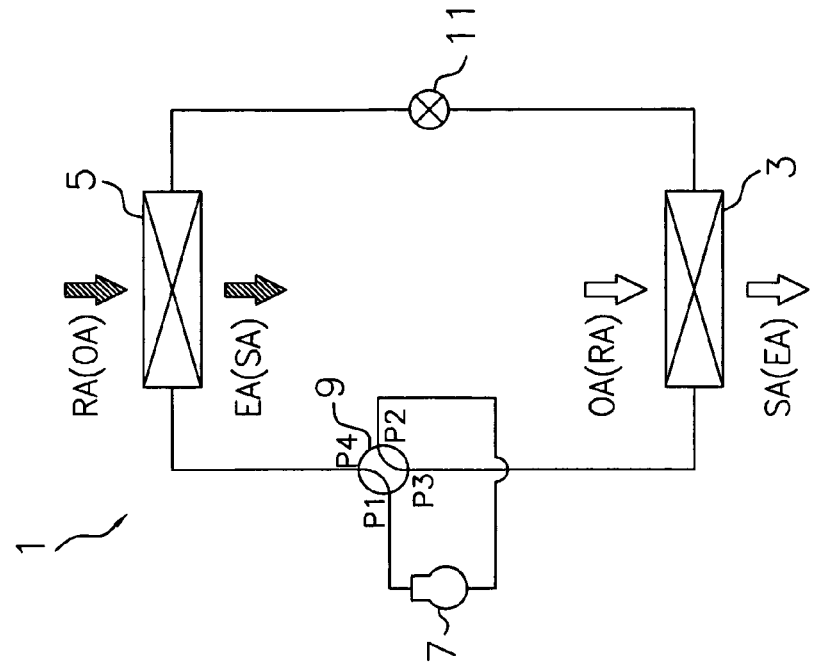

The four-way switch valve 9 is configured such that it can be freely switched between a state where its first port P1 and its third port P3 are communicated and its second port P2 and its fourth port P4 are communicated (the state shown in FIG. 4(A)) and a state where its first port P1 and its fourth port P4 are communicated and its second port P2 and its third port P3 are communicated (the state shown in FIG. 4(B)). Additionally, by switching the four-way switch valve 9, switching is performed between a first state where the first absorptive heat exchanger 3 functions as a condenser and the second absorptive heat exchanger 5 functions as an evaporator and a second state where the second absorptive heat exchanger 5 functions as a condenser and the first absorptive heat exchanger 3 functions as an evaporator.

<Detailed Configuration of the Inside of the Air Conditioner>

Next, the internal configuration of the air conditioner 10 will be described in greater detail on the basis of FIGS. 1 to 3. In FIG. 1, the lower end of the casing 17 is the front side of the casing 17, the upper end is the rear side of the casing 17, the left end is the left side of the casing 17, and the right end is the right side of the casing 17. Also, in FIGS. 2 and 3, the upper end of the casing 17 is the top side of the casing 17, and the lower end is the bottom side of the casing 17.

The casing 17 is square in plan view and formed in a flat box shape. A first intake port 19 that takes in outside air OA and a second intake port 21 that takes in return air RA from indoors that is return air are formed in a left side surface plate 17a of the casing 17. A first blowout port 23 that expels exhaust air EA to outdoors and a second blowout port 25 that supplies supply air SA that is air-conditioned air to the indoors are formed in a right side surface plate 17b of the casing 17.

A partition plate 27 that is a partition member is disposed inside the casing 17. An air chamber 29a and a machine chamber 29b are formed inside the casing 17 by the partition plate 27. The partition plate 27 is disposed in the vertical direction, which is the thickness direction, of the casing 17. In FIGS. 2 and 3, the partition plate 27 is disposed from an upper surface plate 17e of the casing 17 at the upper end to a lower surface plate 17f of the casing 17 at the lower end. Moreover, in FIG. 1, the partition plate 27 is disposed from a front surface plate 17c of the casing 17 at the lower end to a rear surface plate 17d of the casing 17 at the upper end. Further, in FIG. 1, the partition plate 27 is disposed somewhat to the right of the center portion of the casing 17.

In the machine chamber 29b, machine parts such as the inverter compressor 7 but excluding the absorptive heat exchangers 3 and 5 in the refrigerant circuit 1 are disposed, and a first fan 79 and a second fan 77 are housed. The first fan 79 is connected to the first blowout port 23, and the second fan 77 is connected to the second blowout port 25.

In the air chamber 29a of the casing 17, a first end surface plate 33, a second end surface plate 31, and a center divider plate 67, which are partition members, are disposed. The first end surface plate 33, the second end surface plate 31, and the divider plate 67 are disposed in the vertical direction, which is the thickness direction, of the casing 17, and as shown in FIGS. 2 and 3, are disposed from the upper surface plate 17e to the lower surface plate 17f of the casing 17.

As shown in FIG. 1, the first end surface plate 33 and the second end surface plate 31 are disposed from the left side surface plate 17a of the casing 17 to the partition plate 27. Further, in FIG. 1, the first end surface plate 33 is disposed somewhat above (near the rear surface plate 17d) the center portion of the casing 17, and in FIG. 1, the second end surface plate 31 is disposed somewhat below (near the front surface plate 17c) the center portion of the casing 17.

As shown in FIG. 1, the divider plate 67 is disposed such that it spans the distance between the first end surface plate 33 and the second end surface plate 31.

Inside the casing 17, a first heat exchange chamber 69 is divided off and formed by the first end surface plate 33, the second end surface plate 31, the divider plate 67, and the partition plate 27. Further, inside the casing 17, a second heat exchange chamber 73 is divided off and formed by the first end surface plate 33, the second end surface plate 31, the divider plate 67, and the left side surface plate 17a of the casing 17. In other words, the first heat exchange chamber 69 is positioned at the right side in FIG. 1, and the second heat exchange chamber 73 is positioned at the left side in FIG. 1, such that the first heat exchange chamber 69 and the second heat exchange chamber 73 are formed adjacent and parallel to each other.

Further, the first absorptive heat exchanger 3 is disposed in the first heat exchange chamber 69, and the second absorptive heat exchanger 5 is disposed in the second heat exchange chamber 73.

Between the first end surface plate 33 and the rear surface plate 17d of the casing 17, a horizontal plate 61, which is a partition member, is disposed as shown in FIG. 2 and a first inflow path 63 and a first outflow path 65 are formed. Further, between the second end surface plate 31 and the front surface plate 17c of the casing 17, a horizontal plate 55, which is a partition member, is disposed as shown in FIG. 3 and a second inflow path 57 and a second outflow path 59 are formed.

The horizontal plates 61 and 55 partition the interior space of the casing 17 above and below in the vertical direction, which is the thickness direction, of the casing 17. Additionally, in FIG. 2, the first inflow path 63 is formed near the upper surface plate 17e and the first outflow path 65 is formed near the lower surface plate 17f, and in FIG. 3, the second inflow path 57 is formed near the upper surface plate 17e and the second outflow path 59 is formed near the lower surface plate 17f.

Additionally, in FIG. 1, the first inflow path 63 and the first outflow path 65, and the second inflow path 57 and the second outflow path 59, are disposed in plane symmetry based on a center plane (hypothetical plane positioned in the middle of the front surface plate 17c and the rear surface plate 17d) that crosses the first heat exchange chamber 69 and the second heat exchange chamber 73.

The first inflow path 63 is communicated with the first intake port 19. The first outflow path 65 is communicated with the first fan 79 and is communicated with the first blowout port 23. The second inflow path 57 is communicated with the second intake port 21. The second outflow path 59 is communicated with the second fan 77 and is communicated with the second blowout port 25.

As shown in FIG. 2, four openings 33a to 33d are formed in the first end surface plate 33, and a first damper 47, a second damper 49, a third damper 51, and a fourth damper 53 are respectively disposed in the openings 33a to 33d. The four openings 33a to 33d are positioned close to a matrix direction. In other words, the openings 33a to 33d are disposed in two squares each above and below and right and left, the first opening 33a and the third opening 33c open to the first heat exchange chamber 69, and the second opening 33b and the fourth opening 33d open to the second heat exchange chamber 73.

The first opening 33a allows the first inflow path 63 and the first heat exchange chamber 69 to communicate with each other, and the third opening 33c allows the first outflow path 65 and the first heat exchange chamber 69 to communicate with each other. Further, the second opening 33b allows the first inflow path 63 and the second heat exchange chamber 73 to communicate with each other, and the fourth opening 33d allows the first outflow path 65 and the second heat exchange chamber 73 to communicate with each other.

As shown in FIG. 3, four openings 31a to 31d are formed in the second end surface plate 31, and a fifth damper 35, a sixth damper 37, a seventh damper 39, and an eighth damper 41 are respectively disposed in the openings 31a to 31d. The four openings 31a to 31d are positioned close to a matrix direction.

In other words, the openings 31a to 31d are disposed in two squares each above and below and right and left, the fifth opening 31a and the seventh opening 31c open to the first heat exchange chamber 69, and the sixth opening 31b and the eighth opening 31d open to the second heat exchange chamber 73.

The fifth opening 31a allows the second inflow path 57 and the first heat exchange chamber 69 to communicate with each other, and the seventh opening 31c allows the second outflow path 59 and the first heat exchange chamber 69 to communicate with each other. Further, the sixth opening 31b allows the second inflow path 57 and the second heat exchange chamber 73 to communicate with each other, and the eighth opening 31d allows the second outflow path 59 and the second heat exchange chamber 73 to communicate with each other.

<Outline of First State and Second State of Air Conditioner and Batch Switching Operation between Both States>

The air conditioner 10 of the present embodiment, as in the first state shown in FIG. 4(A), takes in as second air the return air RA from the indoors or the outside air OA to the first absorptive heat exchanger 3 functioning as a condenser, performs dehumidification, and then expels the exhaust air EA to the outdoors or supplies the supply air SA to the indoors. Together with this, in the first state, the air conditioner 10 takes in as first air the outside air OA or the return air RA from the indoors to the second absorptive heat exchanger 5 functioning as an evaporator, performs humidification, and then supplies the supply air SA to the indoors or expels the exhaust air EA to the outdoors.

Then, the air conditioner 10 switches the four-way switch valve 9 at a predetermined batch switching time interval to perform switching of the air flow path resulting from the dampers 47 to 53 and 35 to 41. Thus, the air conditioner 10 switches to the second state shown in FIG. 4(B).

In the second state, the air conditioner 10 takes in as first air the outside air RA or the return air RA from the indoors to the first absorptive heat exchanger 3 functioning as an evaporator, performs humidification, and then supplies the supply air SA to the indoors or expels the exhaust air EA to the outdoors. Together with this, in the second state, the air conditioner 10 takes in as second air the return air RA from the indoors or the outside air OA to the second absorptive heat exchanger 5 functioning as a condenser, performs dehumidification, and then expels the exhaust air EA to the outdoors or supplies the supply air SA to the indoors.

In this manner, the air conditioner 10 of the present embodiment switches between the first state and the second state and can alternately cause the absorbing operation and the regenerating operation to be performed in the absorptive heat exchangers 3 and 5. That is, in the absorptive heat exchangers 3 and 5, batches called the absorbing operation or the regenerating operation are switched at a predetermined batch switching time interval.

<Dehumidifying Operation and Humidifying Operation of the Air Conditioner>

Next, the dehumidifying operation and the humidifying operation of the air conditioner 10 will be described.

When the air conditioner 10 performs the dehumidifying operation, it causes the first absorptive heat exchanger 3 and the second absorptive heat exchanger 5 to alternately function as an evaporator to cause moisture included in the air flowing inside the air conditioner 10 via the first absorptive heat exchanger 3 or the second absorptive heat exchanger 5 to be absorbed by the absorbing agent. The air conditioner 10 also causes the second absorptive heat exchanger 5 or the first absorptive heat exchanger 3 to function as a condenser to discharge the moisture absorbed in the absorbing agent with respect to the air flowing inside the air conditioner 10 via the second absorptive heat exchanger 5 or the first absorptive heat exchanger 3 and regenerate the absorbing agent by the condensation heat. Additionally, the direction of the refrigerant circulation in the refrigerant circuit 1 is switched by the four-way switch valve 9 such that the air dehumidified by the absorbing agent is supplied to the indoors and the air whose moisture has been discharged from the absorbing agent is discharged to the outdoors, and the air flow path is switched by the first to eighth dampers 47 to 53 and 35 to 41.

When the air conditioner 10 performs the humidifying operation, the moisture included in the air flowing inside the air conditioner 10 is absorbed by the absorbing agent due to the heat absorbing action of the first absorptive heat exchanger 3 or the second absorptive heat exchanger 5 functioning as an evaporator. Meanwhile, the moisture absorbed by the absorbing agent is discharged with respect to the air flowing inside the air conditioner 10 and the absorbing agent is regenerated due to the heat releasing action of the second absorptive heat exchanger 5 or the first absorptive heat exchanger 3 functioning as a condenser. Additionally, the direction of the refrigerant circulation in the refrigerant circuit 1 is switched by the four-way switch valve 9 such that the air humidified by the discharge of the moisture from the absorbing agent is supplied to the indoors, and the air flow path is switched first to eighth dampers 47 to 53 and 35 to 41.

Specifically, when the air conditioner 10 performs the dehumidifying operation in a total ventilation mode (when the air conditioner 10 performs a dehumidifying ventilation operation), the air conditioner 10 takes in the outside air OA, causes the moisture in the outside air OA to be absorbed by the absorbing agent carried on the surface of the first absorptive heat exchanger 3 or the second absorptive heat exchanger 5 functioning as an evaporator, and supplies the outside air OA the indoors as the dehumidified supply air SA. Meanwhile, the air conditioner 10 takes in the return air RA from the indoors, causes the moisture to be discharged from the absorbing agent carried on the surface of the second absorptive heat exchanger 5 or the first absorptive heat exchanger 3 functioning as a condenser, regenerates the absorbing agent, and discharges the return air RA that has become humidified air to the outdoors as the exhaust air EA.

Further, when the air conditioner 10 performs the dehumidifying operation in a circulation mode (when the air conditioner 10 performs a dehumidifying circulation operation), the air conditioner 10 takes in the return air RA from the indoors, causes the moisture to be absorbed by the absorbing agent carried on the surface of the first absorptive heat exchanger 3 or the second absorptive heat exchanger 5 functioning as an evaporator, and supplies the dehumidified return air RA to the indoors as the supply air SA. Meanwhile, in regard to the regeneration of the absorbing agent, the air conditioner 10 takes in the outside air OA, causes the moisture to be discharged to the outside air OA from the absorbing agent carried on the surface of the second absorptive heat exchanger 5 or the first absorptive heat exchanger 3 functioning as a condenser, regenerates the absorbing agent, and discharges the humidified outside air OA to the outdoors as the exhaust air EA.

Further, when the air conditioner 10 performs the humidifying operation in the total ventilation mode (when the air conditioner 10 performs a humidifying ventilation operation), the air conditioner 10 takes in the return air RA from the indoors, absorbs the moisture included in the taken-in air by the absorbing agent carried on the surface of the first absorptive heat exchanger 3 or the second absorptive heat exchanger 5 functioning as an evaporator, and expels it to the outdoors as the dehumidified return air RA and the exhaust air EA. Meanwhile, the air conditioner 10 takes in the outside air OA, causes the moisture to be discharged from the absorbing agent carried on the surface of the second absorptive heat exchanger 5 or the first absorptive heat exchanger 3 functioning as a condenser, regenerates the absorbing agent, and supplies the humidified outside air OA to the indoors as the supply air SA.

Further, when the air conditioner 10 performs the humidifying operation in the circulation mode (when the air conditioner 10 performs a humidifying circulation operation), the air conditioner 10 takes in the outside air OA, causes the moisture included in the taken-in outside air OA to be absorbed by the absorbing agent carried on the surface of the first absorptive heat exchanger 3 or the second absorptive heat exchanger 5 functioning as an evaporator, and discharges the dehumidified outside air OA to the outdoors as the exhaust air EA. Meanwhile, the air conditioner 10 takes in the return air RA from the indoors, discharges the moisture from the absorbing agent carried on the surface of the second absorptive heat exchanger 5 or the first absorptive heat exchanger 3 functioning as a condenser, regenerates the absorbing agent, and supplies the humidified return air RA to the indoors as the supply air SA.

<Details of Each Operation and Air Conditioning Capability Control by the Controller>

As shown in FIG. 5, in the present embodiment, a temperature sensor 12 such as a thermistor is disposed in order to measure the temperature of the refrigerant inside the first absorptive heat exchanger 3. Further, a temperature sensor 13 is disposed in order to measure the temperature of the refrigerant inside the second absorptive heat exchanger 5. These temperature sensors 12 and 13 specifically measure the temperature of the refrigerant by contacting the heat exchange tubes through which the refrigerant in the absorptive heat exchangers 3 and 5 pass and measuring the temperatures of the heat exchange tubes, and are connected to the controller 2, which comprises a CPU and the like.

The controller 2 controls the capacity of the inverter compressor 7 by controlling the frequency of the inverter compressor 7 and also controls the batch switching time interval on the basis of the temperatures of the refrigerant in the first absorptive heat exchanger 3 and the second absorptive heat exchanger 5 detected by the temperature sensors 12 and 13. Further, the controller 2 includes an input unit 2a such as a DIP switch that allows input by a user or a maintenance person, and performs control of the capacity of the inverter compressor 7 and control of the batch switching time interval such that a load (latent heat load, sensible heat load, or total heat load) to be preferentially processed that has been inputted to the input unit 2a is preferentially processed. It will be noted that the total heat load is the sum of the latent heat load and the sensible heat load.

Specifically, control of the batch switching time interval is control of the batch switching time interval, which is the time interval when switching of the four-way switch valve 9 and switching of the four-way switch valve 9 and the air flow path resulting from the first to eighth dampers 47 to 53 and 35 to 41 are performed.

Moreover, in the present embodiment, the supply air humidity and the humidity of the indoor air are also used as additional control conditions outside of the temperatures of the refrigerant in the first absorptive heat exchanger 3 and the second absorptive heat exchanger 5. A supply air humidity sensor 14 for measuring the supply air humidity and an indoor air humidity sensor 15 for measuring the humidity of the indoor air are also connected to the controller 2.

Below, each operation of the air conditioner 10 of the present embodiment will be described in detail, and then the air conditioning capability control including control of the batch switching time interval will be described in detail. Here, a cooling and dehumidifying operation and a heating and dehumidifying operation will be described as representative operations, but it is also possible for the air conditioner to conduct a cooling and humidifying operation and a heating and humidifying operation by shifting the time of the switching of the four-way switch valve 9 and the switching of the air flow path resulting from the first to eighth dampers 47 to 53 and 35 to 41, or more finely controlling the switching of the air flow path resulting from the first to eighth dampers 47 to 53 and 35 to 41.

(Cooling and Dehumidifying Ventilation Operation)

In the first state, the four-way switch valve 9 is switched to the state shown in FIG. 5 in a state where the first fan 79 and the second fan 77 have been driven. As a result, the regenerating (desorbing) operation of the absorbing agent by the second absorptive heat exchanger 5 functioning as a condenser and the absorbing operation of the absorbing agent by the first absorptive heat exchanger 3 functioning as an evaporator are performed. In other words, in the first state, the return air RA from the indoors is supplied to the second absorptive heat exchanger 5 and the moisture desorbed from the second absorptive heat exchanger 5 is imparted to the ventilation air RA, whereby the humidified ventilation air RA is expelled to the outdoors as the exhaust air EA. Meanwhile, the outside air OA is supplied to the first absorptive heat exchanger 3, the moisture in the outside air OA is absorbed in the first absorptive heat exchanger 3, and the dehumidified outside air OA is supplied to the indoors as the supply air SA. This supply air SA is dehumidified, and is also cooled by the first absorptive heat exchanger 3 functioning as an evaporator.

In other words, the high-temperature high-pressure refrigerant discharged from the inverter compressor 7 flows to the second absorptive heat exchanger 5 as a heating medium for heating, and the absorbing agent carried on the outer surface of the second absorptive heat exchanger 5 is heated. The moisture is desorbed from the absorbing agent due to this heating, and the absorbing agent of the second absorptive heat exchanger 5 is regenerated.

Meanwhile, the refrigerant condensed by the second absorptive heat exchanger 5 is depressurized by the expansion valve 11. The refrigerant after depressurization flows to the first absorptive heat exchanger 3 as a heating medium for cooling. In this first absorptive heat exchanger 3, absorption heat is generated when the absorbing agent carried on the outer surface of the first absorptive heat exchanger 3 absorbs the moisture in the outside air OA. The refrigerant in the first absorptive heat exchanger 3 absorbs this absorption heat and the heat of the outside air OA and evaporates. The evaporated refrigerant returns to the inverter compressor 7, where it is compressed.

After this operation has been performed for the predetermined batch switching time interval in this first state, the air conditioner 10 is switched to the second state.

In the second state, in a state where the first fan 79 and the second fan 77 have been driven, the four-way switch valve 9 is switched from the state shown in FIG. 5 (i.e., the state where the refrigerant is pressure-sent from the inverter compressor 7 to the second absorptive heat exchanger 5) to a state where the refrigerant is pressure-sent from the inverter compressor 7 to the first absorptive heat exchanger 3. Further, due to switching of the air flow path resulting from the dampers 47 to 53 and the dampers 35 to 41, the return air RA from the indoors is supplied to the first absorptive heat exchanger 3 and the outside air OA is supplied to the second absorptive heat exchanger 5.

As a result, in the second state, the return air RA from the indoors is supplied to the first absorptive heat exchanger 3, the moisture desorbed from the absorbing agent of the first absorptive heat exchanger 3 is discharged to the ventilation air RA, and the humidified ventilation air RA is expelled as the exhaust air EA. Meanwhile, the outside air RA is supplied to the second absorptive heat exchanger 5 and the moisture in the taken-in outside air OA is absorbed by the absorbing agent of the second absorptive heat exchanger 5, whereby the dehumidified outside air OA is supplied to the indoors as the supply air SA. This supply air SA is dehumidified, and is also cooled by the second absorptive heat exchanger 5 functioning as an evaporator.

In other words, the high-temperature high-pressure refrigerant discharged from the inverter compressor 7 flows to the first absorptive heat exchanger 3 as a heating medium for heating, and the absorbing agent carried on the outer surface of the first absorptive heat exchanger 3 is heated. The moisture is desorbed from the absorbing agent due to this heating, and the absorbing agent of the first absorptive heat exchanger 3 is regenerated.

Meanwhile, the refrigerant condensed by the first absorptive heat exchanger 3 is depressurized by the expansion valve 11. The refrigerant after depressurization flows to the second absorptive heat exchanger 5 as a heating medium for cooling. In the second absorptive heat exchanger 5, absorption heat is generated when the absorbing agent carried on the outer surface of the second absorptive heat exchanger 5 absorbs the moisture in the outside air OA. The refrigerant of the second absorptive heat exchanger 5 absorbs this absorption heat and the heat of the outside air OA and evaporates. The evaporated refrigerant returns to the inverter compressor 7, where it is compressed.

The cooling and dehumidification and the ventilation are continuously performed by alternately switching between the first state and the second state at the predetermined batch switching time interval.

(Cooling and Dehumidifying Circulation Operation)

Figure 6:
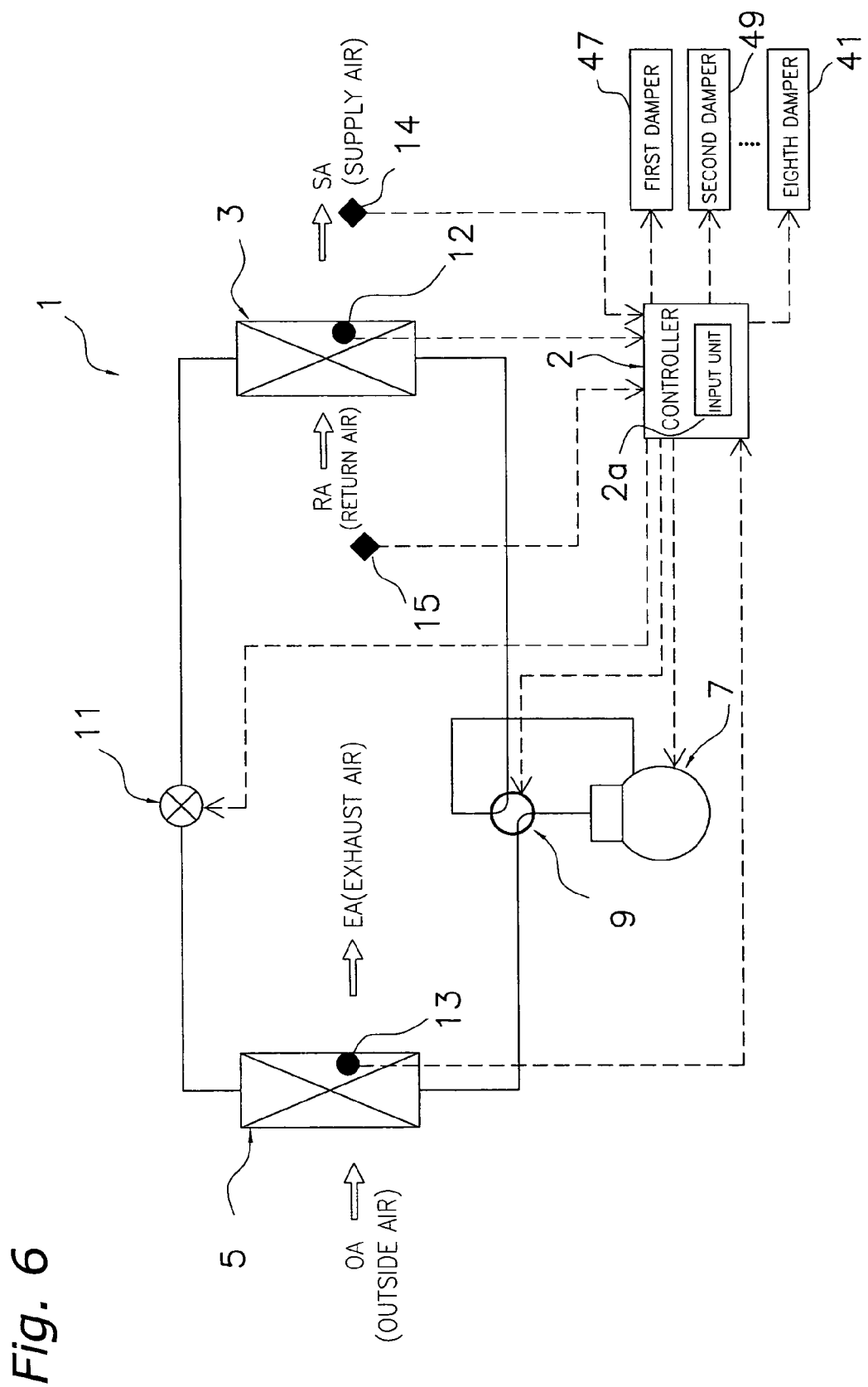
FIG. 6 is a block diagram showing the state of a cooling and dehumidifying circulation operation in the air conditioner.

In comparison to the above-described cooling and dehumidifying ventilation operation, the basic absorbing operation and regenerating operation of the heat exchangers are the same but, as shown in FIG. 6, are different in that the outside air OA is taken in, supplied to the second absorptive heat exchanger 5 (or the first absorptive heat exchanger 3) functioning as a condenser, is again expelled to the outdoors as the exhaust air EA, the return air RA taken in from the indoors is supplied to the first absorptive heat exchanger 3 (or the second absorptive heat exchanger 5) functioning as an evaporator, and is again supplied to the indoors as the supply air SA. That is, the supply air SA supplied to the indoors becomes air in which the ventilation air RA taken in from the indoors is dehumidified and cooled, and supply of the outside air OA to the indoors is not performed.

(Heating and Humidifying Ventilation Operation)

Figure 7:
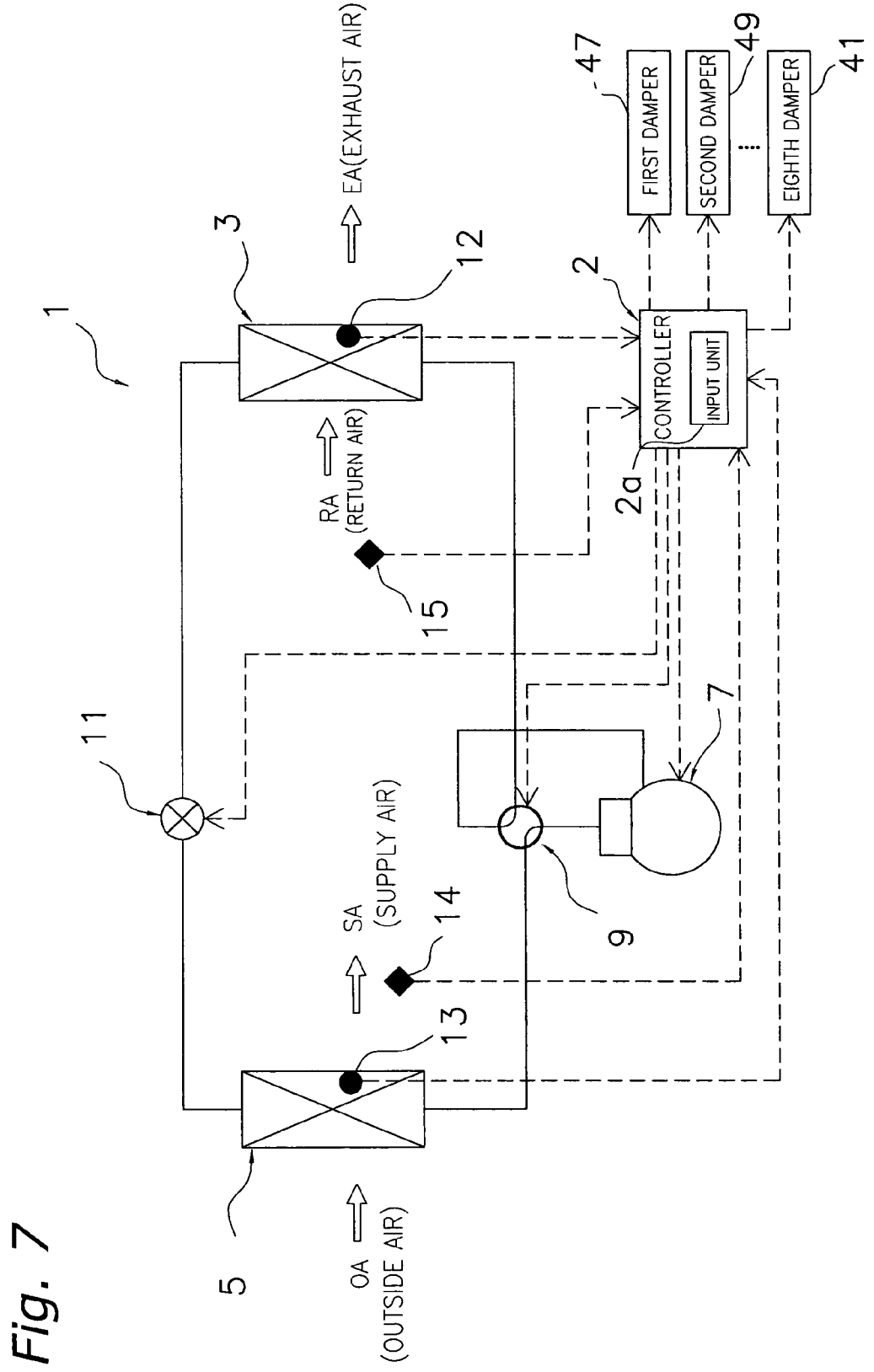
FIG. 7 is a block diagram showing the state of a heating and humidifying ventilation operation in the air conditioner.

In the first state, as shown in FIG. 7, the outside air OA is taken in and supplied to the second absorptive heat exchanger 5, and the outside air OA (humidified air) to which the moisture desorbed from the absorbing agent of the second absorptive heat exchanger 5 has been imparted is supplied to the indoors as the supply air SA. Meanwhile, the return air RA taken in from the indoors is supplied to the first absorptive heat exchanger 3, and the moisture in the return air RA is absorbed by the absorbing agent of the first absorptive heat exchanger 3. The return air RA dehumidified in this manner is expelled to the outdoors as the exhaust air EA. This supply air SA is humidified, and is also heated by the second absorptive heat exchanger 5 functioning as a condenser.

After the above-described operation is performed for the predetermined batch switching time interval in this first state, the air conditioner 10 is switched to the second state.

In the second state, in a state where the first fan 79 and the second fan 77 have been driven, the four-way switch valve 9 is switched from the state shown in FIG. 7 (i.e., the state where the refrigerant is pressure-sent from the inverter compressor 7 to the second absorptive heat exchanger 5) to a state where the refrigerant is pressure-sent from the inverter compressor 7 to the first absorptive heat exchanger 3. Further, the return air RA from the indoors is supplied to the second absorptive heat exchanger 5 and the outside air OA is supplied to the first absorptive heat exchanger 3 due to the switching of the air flow path resulting from the dampers 47 to 53 and the dampers 35 to 41.

As a result, in the second state, the moisture desorbed from the absorbing agent of the first absorptive heat exchanger 3 is imparted to the outside air OA, whereby the humidified outside air OA is supplied to the indoors as the supply air SA. Meanwhile, the moisture in the return air RA is absorbed by the absorbing agent of the second absorptive heat exchanger 5, whereby the dehumidified return air RA is expelled as the exhaust air EA. Further, the supply air SA is heated by the first absorptive heat exchanger 3 functioning as a condenser.

The heating and humidification and the ventilation are continuously performed by alternately switching between the first state and the second state at the predetermined batch switching time interval.

(Heating and Humidifying Circulation Operation)

Figure 8:
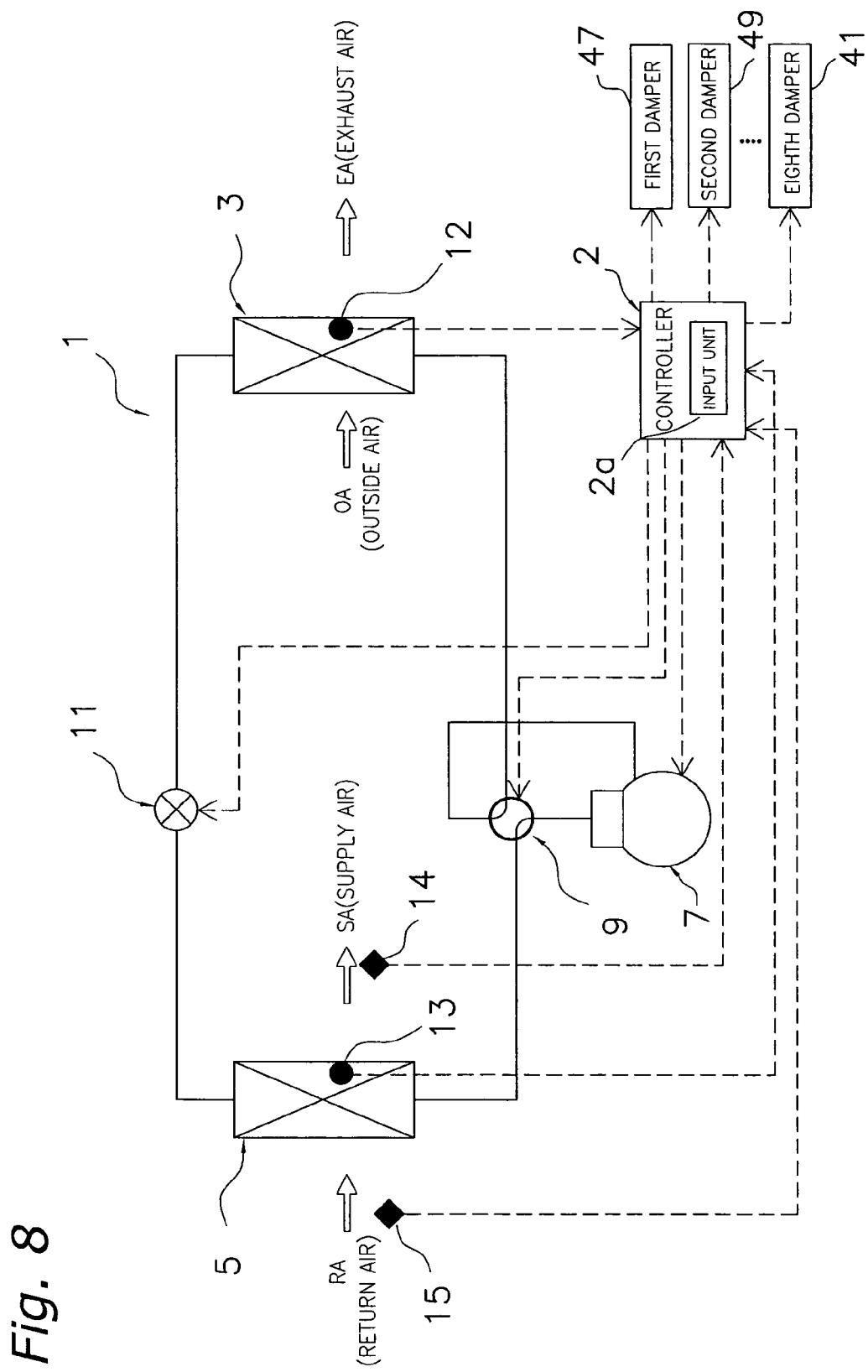
FIG. 8 is a block diagram showing the state of a heating and humidifying circulation operation in the air conditioner.

In comparison to the above-described heating and humidifying ventilation operation, the basic absorbing operation and regenerating operation of the heat exchangers are the same but, as shown in FIG. 8, are different in that the outside air OA is taken in, supplied to the first absorptive heat exchanger 3 (or the second absorptive heat exchanger 5) functioning as an evaporator, is again expelled to the outdoors as the exhaust air EA, the return air RA taken in from the indoors is supplied to the second absorptive heat exchanger 5 (or the first absorptive heat exchanger 3) functioning as a condenser, and is again supplied to the indoors as the supply air SA. That is, the supply air SA supplied to the indoors becomes air in which the ventilation air RA taken in from the indoors is humidified and heated, and supply of the outside air OA to the indoors is not performed.

(Air Conditioning Capability Control)

Next, the air conditioning capability control—that is, control of the capacity of the inverter compressor 7 and control for changing the batch switching time interval—will be described. The control of the capacity of the inverter compressor 7 is specifically performed by changing the compressor frequency of the inverter compressor 7, and becomes total heat capability control including control of latent heat capability to process the latent heat load. Further, the control for changing the batch switching time intervals becomes mainly control of the sensible/latent heat capability ratio, which is the ratio of latent heat capability to process the latent heat load to sensible heat capability to process the sensible heat load.

In the present embodiment, when the air conditioner 10 performs any of the above operations, the controller 2 performs control of the capacity of the inverter compressor 7 and control for changing the batch switching time interval on the basis of the evaporator temperature and the condenser temperature of the first absorptive heat exchanger 3 and the second absorptive heat exchanger 5 functioning as an evaporator and a condenser. Further, in addition to using the evaporator temperature and the condenser temperature as control targets, the controller 2 may also use one or plural parameters out of the humidity of the indoor air, the humidity of the supply air SA, and the temperature of the supply air SA as control targets.

First, control of the capacity of the inverter compressor 7 and control for changing the batch switching time intervals using the condenser temperature or the evaporator temperature as the control target will be described.

When the controller 2 uses the condenser temperature as the control target to control the compressor frequency, the controller 2 raises the compressor frequency when the condenser temperature is lower than a target value and lowers the compressor frequency when the condenser temperature is higher than the target value. Further, when the controller 2 uses the condenser temperature as the control target to control the batch switching time interval, the controller 2 shortens the batch switching time interval when the condenser temperature is lower than the target value and lengthens the batch switching time interval when the condenser temperature is higher than the target value.

When the controller 2 uses the evaporator temperature as the control target to control the compressor frequency, the controller 2 lowers the compressor frequency when the evaporator temperature is lower than a target value and raises the compressor frequency when the evaporator temperature is higher than the target value. Further, when the controller 2 controls the batch switching time interval, the controller 2 lengthens the batch switching time interval when the evaporator temperature is lower than the target value and shortens the batch switching time interval when the evaporator temperature is higher than the target value.

Moreover, it is also possible for the controller 2 to use a combination of the condenser temperature and the evaporator temperature as control targets to simultaneously control the compressor frequency and the batch switching time interval.

Figure 9:
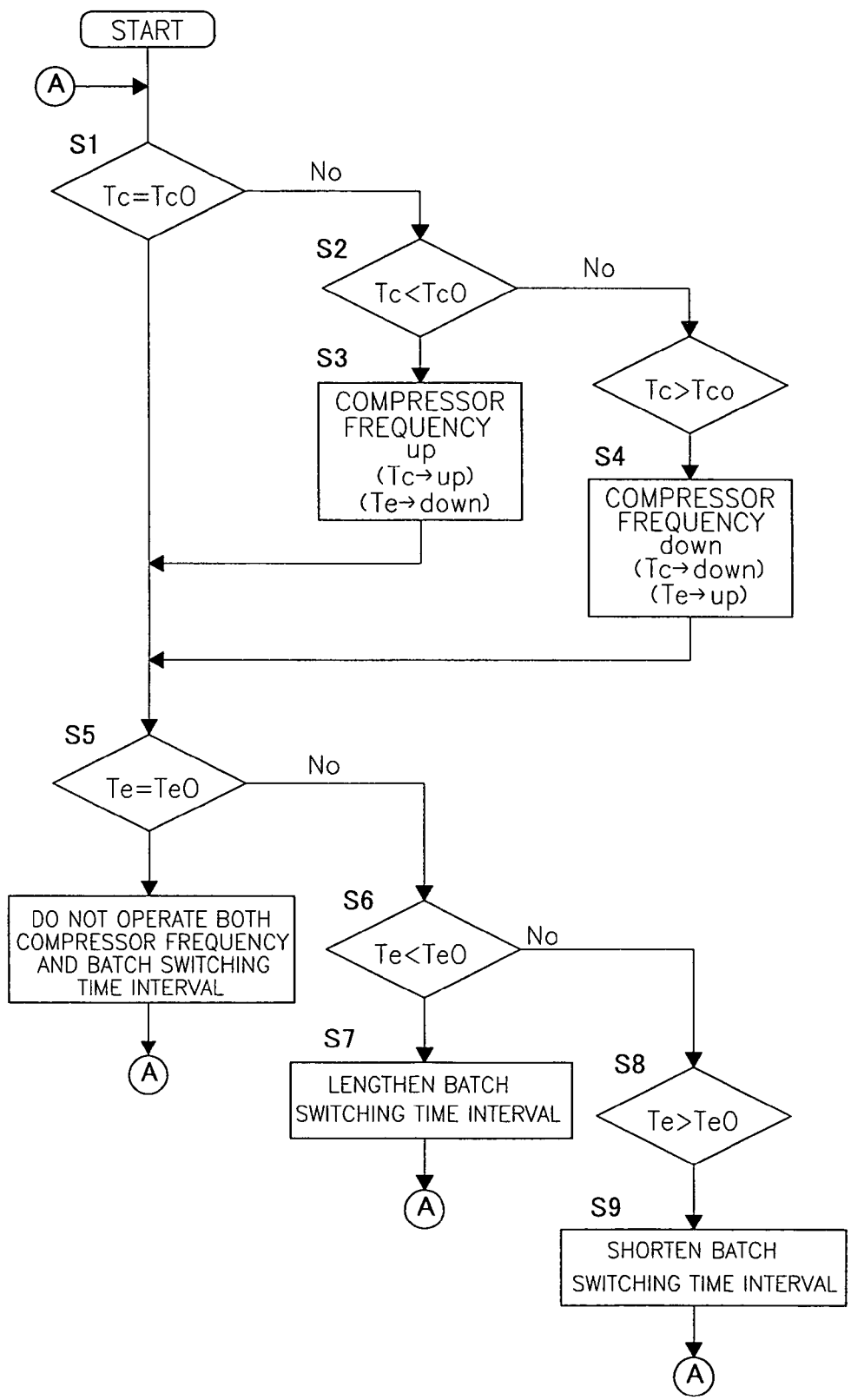
FIG. 9 is a flowchart of capability control using a condenser temperature and an evaporator temperature in the air conditioner.

Next, an example of control when the controller 2 performs air conditioning capability control using the two control targets of the condenser temperature and the evaporator temperature will be described with reference to FIG. 9. This control is used during the cooling and dehumidifying operating and during the heating and humidifying operation.

Here, control is performed where the condenser temperature Tc serves as a first target and the evaporator temperature Te serves as a second target. As shown in FIG. 9, the controller 2 first compares the current condenser temperature Tc with a target condenser temperature TcO (step S1 and step S2). When Tc=TcO, the controller 2 skips to step S5, and when Tc<TcO, the controller 2 raises the compressor frequency (S3). Thus, the current condenser temperature Tc rises and the current evaporator temperature Te drops. On the other hand, when Tc>TcO, the controller 2 lowers the compressor frequency (step S4). Thus, the current condenser temperature Tc drops and the current evaporator temperature Te rises.

Thereafter, in step S5, comparison of the current evaporator temperature Te and a target evaporator temperature TeO is performed (step S5 and step S6). When Te=TeO, the controller 2 returns to the start without operating the compressor frequency and the batch switching time interval. When Te<TeO, the controller 2 lengthens the batch switching time interval (step S7) and thereafter returns to the start. When the controller 2 lengthens the batch switching time interval, the condenser temperature Tc and the evaporator temperature Te both rise.

On the other hand, when Te>TeO (step S8), the controller 2 shortens the batch switching time interval (step S9) and thereafter returns to the start.

Here, because the batches called the absorbing operation or the regenerating operation are switched at the predetermined batch switching time interval in the absorptive heat exchangers 3 and 5, the condenser temperature Tc and the evaporator temperature Te become representative values per batch or average representative values between batches.

Further, in this example, after the controller 2 operates (steps S6 to S9) the batch switching time interval in order to cause the evaporator temperature Te to match the target evaporator temperature TeO, the controller 2 operates (steps S1 to S4) the compressor in order to again regulate the condenser temperature Tc and also operates (steps S6 to S9) the batch switching time interval in order to regulate Te. In the control flow shown in FIG. 9, it is conceivable for a repeat of the above operation to be performed, but there are no problems in terms of operation even if the values do not necessarily converge at Tc=TcO and Te=TeO.

Figure 10:
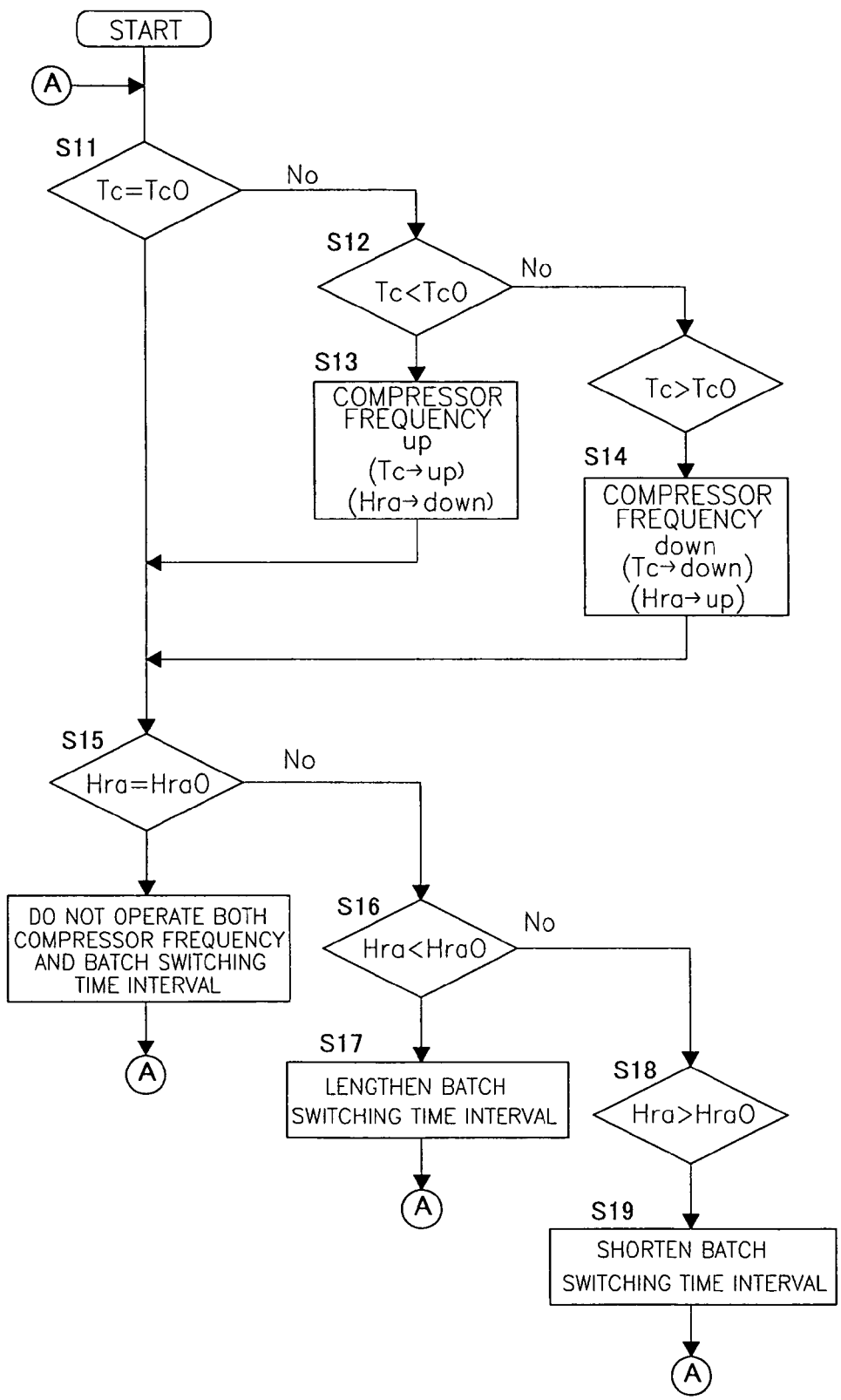
FIG. 10 is a flowchart during cooling and dehumidification of capability control using the condenser temperature and the temperature of indoor air in the air conditioner.
Figure 11:
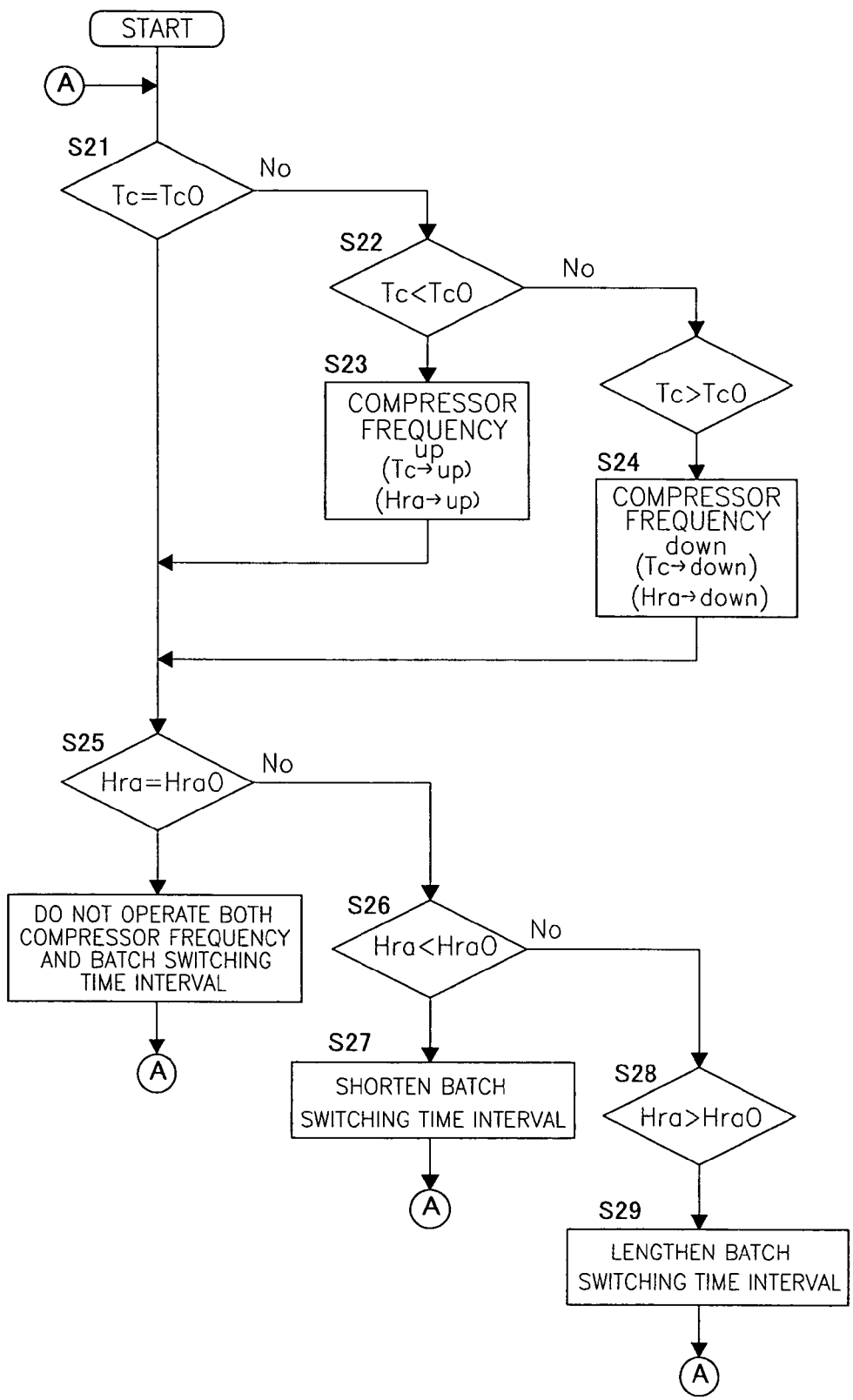
FIG. 11 is a flowchart during heating and humidification of capability control using the condenser temperature and the temperature of indoor air in the air conditioner.

Next, an example of control where the controller 2 performs air conditioning capability control using the two control targets of the condenser temperature and the humidity of the room air will be described with reference to FIG. 10 and FIG. 11. The control of the flowchart of FIG. 10 is adopted when the air conditioner 10 performs the cooling and dehumidifying operation, and the control of the flowchart of FIG. 11 is adopted when the air conditioner 10 performs the heating and humidifying operation.

Here, control is performed where the condenser temperature Tc is used as the first target and the room air humidity Hra is used as the second target.

In control during the cooling and dehumidifying operation, when the controller 2 raises the compressor frequency, the condenser temperature Tc rises and the room air humidity Hra drops. Further, when the controller 2 lengthens the batch switching time interval, the condenser temperature Tc and the room air humidity Hra both rise.

The controller 2 first compares the current condenser temperature Tc with the target condenser temperature TcO (step S11 and step S12). When Tc=TcO, the controller 2 skips to step S15, and when Tc<TcO, the controller 2 raises the compressor frequency (step S13). At this time, the current condenser temperature Tc rises and the current room air humidity Hra drops. On the other hand, when Tc>TcO, the controller 2 lowers the compressor frequency (step S14). At this time, the current condenser temperature Tc drops and the current room air humidity Hra rises.

Thereafter, the controller 2 compares the current room air humidity Hra with a target room air humidity HraO (step S15 and step S16). When Hra=HraO, the controller 2 returns to the start without operating the compressor frequency and the batch switching time interval. When Hra<HraO, the controller 2 lengthens the batch switching time interval (step S17) and thereafter returns to the start. When the controller 2 lengthens the batch switching time interval, the condenser temperature Tc and the room air humidity Hra both rise. On the other hand, when Hra>HraO (step S18), the controller 2 shortens the batch switching time intervals (step S19) and thereafter returns to the start.

In the control of the heating and humidifying operation, similar to the control of the cooling and dehumidifying operation, control is performed where the condenser temperature Tc is used as the first target and the room air humidity Hra is used as the second target.

Further, in the control of the heating and humidifying operation, when the controller 2 raises the compressor frequency, the condenser temperature Tc and the room air humidity Hra both rise. On the other hand, when the controller 2 lengthens the batch switching time interval, the condenser temperature Tc rises and the room air humidity Hra drops.

Here, the controller 2 first compares the current condenser temperature Tc with the target condenser temperature TcO (step S21 and step S22). When Tc=TcO, the controller skips to step S25, and when Tc<TcO, the controller 2 raises the compressor frequency (step S23). At this time, the current condenser temperature Tc and the current room air humidity Hra both rise. On the other hand, when Tc>TcO, the controller 2 lowers the compressor frequency (step S24). At this time, the current condenser temperature Tc and the current room air humidity Hra both drop.

Thereafter, the controller 2 compares the current room air humidity Hra with the target room air humidity HraO (step S25 and step S26). When Hra=HraO, the controller 2 returns to the start without operating the compressor frequency and the batch switching time interval. When Hra<HraO, the controller 2 shortens the batch switching time interval (step S27) and thereafter returns to the start. On the other hand, when Hra>HraO (step S28), the controller 2 shortens the batch switching time interval (step S29) and thereafter returns to the start. When the controller 2 shortens the batch switching time interval, the condenser temperature Tc rises and the room air humidity Hra drops.

(Air Conditioning Capability Control Based on Initial Input Setting)

In regard to the air conditioning capability control, that is, control of the capacity of the inverter compressor 7 and control for changing the batch switching time interval, as described above, the controller 2 performs the control by determining the control targets by appropriately combining the evaporator temperature and the condenser temperature, and moreover the humidity of the room air, the humidity of the supply air, and the temperature of the supply air SA, but a condition based on an initial input setting such as described below is also added.

A load that is to be preferentially processed (latent heat load, sensible heat load, or total heat load) is sometimes inputted by a user or the like to the input unit 2*a* of the controller 2. In this case, control of the capacity of the inverter compressor 7 and control of the batch switching time interval becomes affected by that inputted load as follows.

First, when the inputted load that is to be preferentially processed is the latent heat load, the controller 2 prioritizes, over changing the throughput of the latent head load by controlling the capacity of the inverter compressor 7, changing the throughput of the latent heat load by performing control for changing the batch switching time interval.

Further, when the inputted load to be preferentially processed is the sensible heat load, the controller 2 prioritizes, over changing the throughput of the sensible heat load by controlling the capacity of the inverter compressor 7, changing the throughput of the sensible heat load by performing control for changing the batch switching time interval.

Further, when the inputted load to be preferentially processed is the total heat load, the controller 2 first fixes the sensible/latent heat throughput ratio, which is the ratio of the throughput of the latent heat load to the throughput of the sensible heat load, by controlling the batch switching time interval, and thereafter performs control of the capacity of the inverter compressor 7.

<Characteristics of the Air Conditioner of the Present Embodiment>

(1)

In the air conditioner 10 of the present embodiment, the first absorptive heat exchanger 3 and the second absorptive heat exchanger 5 alternately function as a condenser and an evaporator. Additionally, given that the temperature of the absorbing agent, which directly affects the latent heat capability, follows the temperature of the refrigerant in the condenser and the evaporator than the temperature of the supply air SA or the indoor air temperature, here, the controller 2 uses the evaporator temperature and the condenser temperature as control targets in controlling the capability of the air conditioner 10 (control of the capacity of the compressor 7 and control for changing the batch switching time interval) instead of using the regenerated air temperature or the like which has conventionally been the case.

For this reason, latent heat capability control (control of the amount of dehumidified or humidified water) during dehumidification and humidification that is more appropriate than has conventionally been the case, and control of the sensible/latent heat throughput ratio during dehumidification and humidification, can be performed.

(2)

In the air conditioner 10 of the present embodiment, the first and second absorptive heat exchangers 3 and 5 carry the absorbing agent on their surfaces, so the temperature of the absorbing agent becomes extremely strongly linked to the refrigerant temperature. Consequently, performing control of the capacity of the air conditioner 10 using the evaporator temperature and the condenser temperature as control targets becomes extremely effective.

(3)

Further, in the air conditioner 10, performing capacity control using the condenser temperature as the first target and the evaporator temperature as the second target, and performing capacity control using the condenser temperature and the evaporator temperature as the first target and one or plural parameters out of the humidity of the indoor air, the humidity of the supply air SA, and the temperature of the supply air SA as the second target can be performed, and capability control that is more appropriate in comparison to when control of the capability of the air conditioner 10 is performed just by the condenser temperature and the evaporator temperature becomes possible.

(4)

In the air conditioner 10, the absorbing agent performs the absorbing operation by the absorptive heat exchanger 3 or 5 functioning as an evaporator, and the absorbing agent performs the regenerating operation by the absorptive heat exchanger 5 or 3 functioning as a condenser. Additionally, the control for changing the time interval (batch switching time interval) of the switching between the absorbing operation and the regenerating operation of the absorbing agent is performed by the controller 2 together with controlling the capacity of the inverter compressor 7.

When the controller 2 changes the batch switching time interval, it can change the sensible/latent heat throughput ratio, which is the ratio of the latent heat processing capability to the sensible heat processing capability of the air conditioner 10. When the controller 2 performs control of the capacity of the inverter compressor 7, it can increase/decrease the total heat processing capability, which is the sum of the latent heat processing capability and the sensible heat processing capability. That is, the controller 2 can regulate the latent heat processing capability, the sensible heat processing capability, and the total heat processing capability.

Additionally, the controller 2 having this regulating function performs control of the capacity of the inverter compressor 7 and control for changing the batch switching time interval such that the load (total heat load, latent heat load, or sensible heat load) that a user or the like has inputted to the input unit 2a is preferentially processed. Because such control is performed, the air conditioner 10 can perform appropriate capability control and can provide an air-conditioned environment suited to the liking of that user.

Specifically, when the load to be preferentially processed is the latent heat load, the controller 2 prioritizes, over changing the throughput of the latent heat load by controlling the capacity of the inverter compressor 7, changing the throughput of the latent heat load by performing control for changing the batch switching time interval. That is, here, when the latent heat load is to be preferentially processed, the controller 2 first performs control for changing the batch switching time interval to change the throughput of the latent heat load, and when that does not suffice, the controller 2 performs control of the capacity of the inverter compressor 7 to further change the throughput of the latent heat load. In this manner, because the controller 2 first performs control for changing the batch switching time interval, the controller 2 can increase the throughput of the latent heat load, without having to significantly increase the amount of consumed power by control for raising the capacity of the inverter compressor 7, even when it is necessary to increase the throughput of the latent heat load. For example, it is not necessary for the controller 2 to raise the capacity of the inverter compressor 7 when the necessary throughput of the latent heat load can be ensured by enlarging the ratio of the throughput of the latent heat load with respect to the throughput of the sensible heat load by control for changing the batch switching time interval.

Further, even when the load to be preferentially processed is the sensible heat load, the controller 2 prioritizes, over changing the throughput of the sensible heat load by controlling the capacity of the inverter compressor 7, changing the throughput of the sensible heat load by performing control for changing the batch switching time interval. That is, here, when the sensible heat load is to be preferentially processed, the controller 2 first performs control for changing the batch switching time interval to change the throughput of the sensible heat load, and when that does not suffice, the controller 2 performs control of the capacity of the inverter compressor 7 to further change the throughput of the sensible heat load. In this manner, because the controller 2 first performs control for changing the batch switching time interval, the controller can increase the throughput of the sensible heat load, without having to significantly increase the amount of consumed power by control for raising the capacity of the inverter compressor 7, even when it is necessary to increase the throughput of the sensible heat load. For example, it is not necessary for the controller 2 to raise the capacity of the inverter compressor 7 when the necessary throughput of the sensible heat load can be ensured by enlarging the ratio of the throughput of the sensible heat load with respect to the throughput of the latent heat load by performing control for changing the batch switching time intervals.

Further, when the load to be preferentially processed is the total heat load, the controller 2 first fixes the sensible/latent heat throughput ratio by performing control of the batch switching time interval, and thereafter performs control of the capacity of the inverter compressor 7. This is because when the total heat load is to be prioritized, it is basically not necessary to change the sensible/latent heat throughput ratio, so the controller 2 first fixes the sensible/latent heat throughput ratio and then performs control of the capacity of the inverter compressor 7. Here, unnecessary changes in the sensible/latent heat throughput ratio are controlled. To describe this more specifically, in the air conditioner 10, which is of a format that switches between the absorbing operation and the regenerating operation of the absorbing agent, the potential that regulating the sensible/latent heat throughput ratio in accordance with the ratio of the sensible/latent heat load in the total heat load will lead to the capability control becoming needlessly complicated is high. However, here, the controller 2 fixes the sensible/latent heat throughput ratio and first changes the throughput of the total head load, and can change the throughput of the remaining sensible heat load or latent heat load by regulating the sensible/latent heat throughput ratio from the point in time when the sensible heat or latent heat load and the sensible heat or latent heat throughput are to a certain extent in equilibrium. Consequently, the control can be simplified.

The reason that regulating the sensible/latent heat throughput ratio in accordance with the ratio of the sensible/latent heat load in the total heat load leads to complication of the capability control is as follows. Because the air conditioner 10 employs a format which recovers and uses the temperature (sensible heat) and humidity (latent heat) of the air in a room whose load is to be processed, affects of the state of the air to be processed appear directly and individually in the sensible heat throughput and the latent heat throughput. Consequently, the sensible/latent heat throughput ratio consecutively changes due to the operation of the air conditioner 10 and of other air conditioners, and in accompaniment therewith, the sensible/latent heat throughput of the air conditioner 10 also consecutively changes, so even if the sensible/latent heat throughput ratio were determined first, the necessary throughput would also change when the temperature and humidity conditions of the air to be processed change, and the preferred sensible/latent heat throughput ratio would change. In this manner, it is preferable to change the sensible/latent heat throughput ratio based on the ratio of the throughputs of the necessary sensible heat and the latent heat at the current point in time. Changing the sensible/latent heat throughput ratio while the total heat throughput is being increased/decreased by controlling the capacity of the inverter compressor 7 and when the sensible/latent heat throughputs are also consecutively changing leads to complication of the control and is not preferable.

OTHER EMBODIMENTS

An embodiment of the present invention has been described above, but the present invention is not limited to this embodiment. Various kinds of changes are possible in a range that does not deviate from the gist of the invention.

(1)

In the preceding embodiment, the controller 2 uses the condenser temperature and the evaporator temperature as control targets when performing control of the capability of the air conditioner 10, but even when the condenser pressure and the evaporator pressure are used as control targets, control of the capability of the air conditioner 10 that is more appropriate than has conventionally been the case can similarly be performed.

(2)

In addition to the configuration of the preceding embodiment, as shown in FIG. 12, an expansion valve 18 and a sensible heat exchanger 16 that mainly performs sensible heat processing without including an absorbing agent may be disposed to improve the sensible heat processing capability. Even in an air conditioner of this configuration, the temperature of the absorbing agent of the absorptive heat exchangers 3 and 5 still strongly follows the refrigerant temperature, so the controller 2 can appropriately perform control of the capability of the air conditioner using the condenser temperature and the evaporator temperature or the condenser pressure and the evaporator pressure as control targets.

(3)

In the preceding embodiment, the absorbing agent was carried on the first absorptive heat exchanger 3 and the second absorptive heat exchanger 5, but the present invention is not limited to this. For example, it is also possible to apply the present invention to the humidity controller (air conditioner) described in JP-A-2004-69257.

Figure 13B:
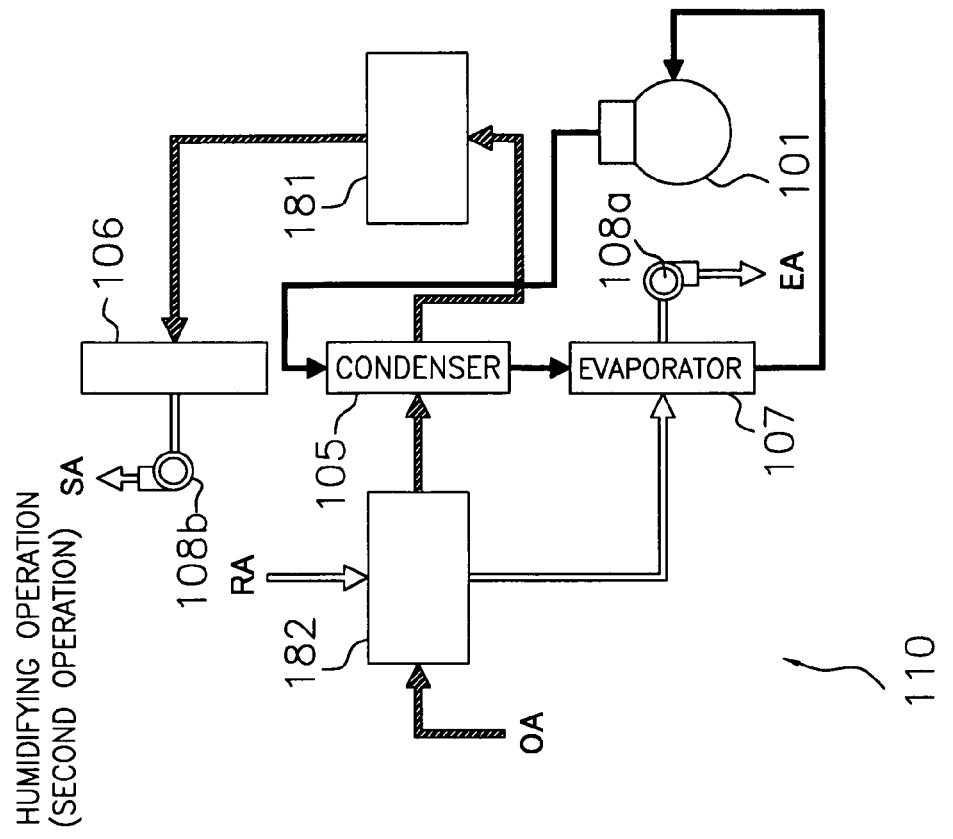
FIG. 13 (A) is a diagram showing a first state of a humidifying operation in an air conditioner pertaining to another embodiment (3) of the present invention.
Figure 13A:
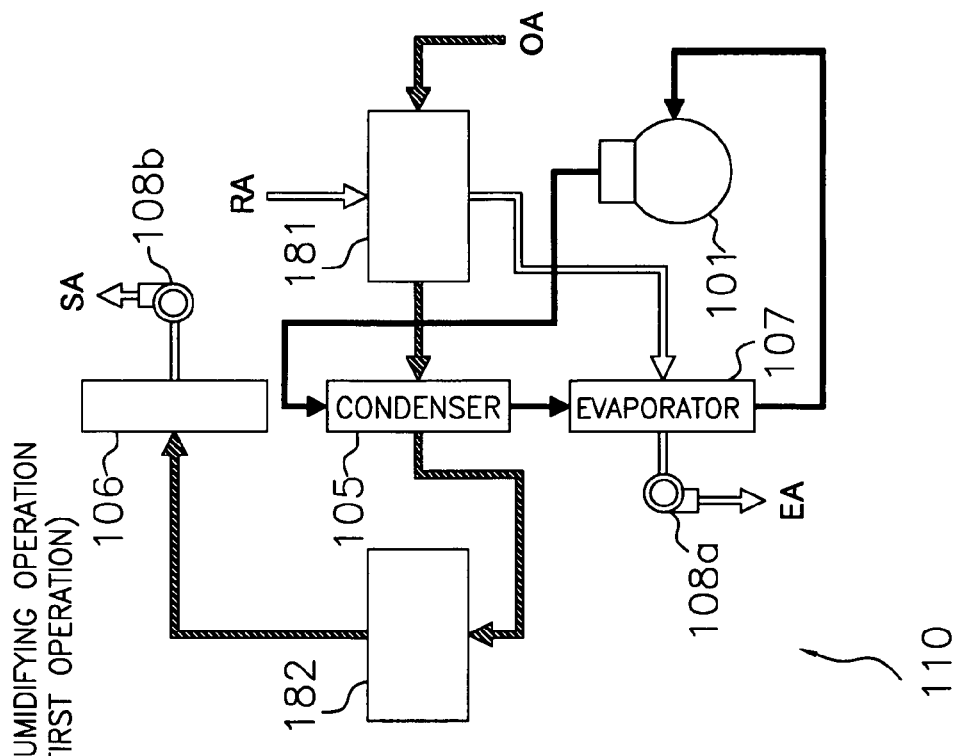

In an air conditioner 110 shown in FIGS. 13(A) and (B), humidity control elements 181 and 182 that include an absorbing agent are disposed away from a regenerative heat exchanger 105 for regenerating the absorbing agent. The humidity control elements 181 and 182 are configured by rectangular flat plate-shaped flat plate members and wave-shaped wave plate members that are alternately stacked together, with humidity control paths and cooling paths being alternately divided off and formed with the flat plate members sandwiched therebetween. The absorbing agent, which comprises an inorganic porous material and a temperature-sensitive organic polymer material, is carried on the surfaces of the wave plate members disposed in the humidity control paths.

The air conditioner 110 alternately performs a first state, where an exhaust air fan 108a and a supply air fan 108b are driven, the return air RA is dehumidified by the first humidity control element 181, and the second humidity control element 182 is regenerated by the outside air OA, and a second state, where the first humidity control element 181 is regenerated by the outside air OA and the return air RA is dehumidified by the second humidity control element 182. Additionally, the air conditioner 110 supplies outside air OA humidified by the humidity control elements 181 and 182 to the room. It will be noted that it is also possible for the air conditioner 110 to conduct the dehumidifying operation by supplying the outside air OA and the return air RA dehumidified by the humidity control elements 181 and 182 to the room as the supply air SA, but here the humidifying operation will be described.

During the humidifying operation, when the exhaust air fan 108a and the supply air fan 108b are driven, the outside air OA is taken into the casing and the return air RA is taken into the casing. Further, during the humidifying operation, in the refrigerant circuit where the refrigeration cycle is produced by a compressor 101, the regenerative heat exchanger 105 becomes a condenser and a heat exchanger 107 becomes an evaporator.

A first operation of the humidifying operation will be described with reference to FIG. 13(A). In this first operation, the absorbing operation in regard to the first humidity control element 181 and the regenerating operation in regard to the second humidity control element 182 are performed. In other words, in the first operation, the air is humidified by the second humidity control element 182, and the absorbing agent of the first humidity control element 181 absorbs the moisture. The return air RA that has been taken into the casing flows into an absorption path of the first humidity control element 181. As the return air RA flows through the absorption path, water vapor (moisture) included in the return air RA is absorbed by the absorbing agent. The return air RA that has been dehumidified in this manner passes through the heat exchanger 107 and is cooled by heat exchange with the refrigerant. Thereafter, the return air RA whose moisture and heat have been taken away is expelled to the outdoors as the exhaust air EA.

Meanwhile, the outside air OA that has been taken into the casing flows into the cooling paths of the first humidity control element 181. As the outside air OA flows through the cooling paths, the absorption heat that arises when the moisture is absorbed in the absorption path by the absorbing agent is absorbed. The outside air OA whose absorption heat has been taken away passes through the regenerative heat exchanger 105. At this time, in the regenerative heat exchanger 105, the outside air OA is heated by heat exchange with the refrigerant.

Then, the outside air OA that has been heated by the first humidity control element 181 and the regenerative heat exchanger 105 is guided into an absorption path of the second humidity control element 182. In this absorption path, the absorbing agent is heated by the outside air OA, the temperature-sensitive organic polymer material causes volume phase transition from a swelling phase to a contracting phase, and the water vapor is desorbed from the absorbing agent. In other words, regeneration of the second humidity control element 182 is performed. Then, the water vapor desorbed from the absorbing agent is discharged into the outside air OA, and the outside air OA is humidified. The outside air OA that has been humidified by the second humidity control element 182 passes through a heat exchanger 106. Here, because the heat exchanger 106 is halted, the outside air OA is neither heated nor cooled. If the heat exchanger 106 were functioning, then the outside air OA would be heated or cooled. The outside air OA leaving the heat exchanger 106 passes through the supply air fan 108b and is supplied to the indoors as the supply air SA.

Next, the second operation of the humidifying operation will be described with reference to FIG. 13(B). In the second operation, conversely from the first operation, an absorbing operation in regard to the second humidity control element 182 and a regenerating operation in regard to the first humidity control element 181 are performed. In other words, in the second operation, the air is humidified by the first humidity control element 181 and the absorbing agent of the second humidity control element 182 absorbs the water vapor.

The return air RA taken into the casing flows into the absorption path of the second humidity control element 182 shown in FIG. 13(B). As the return air RA flows through the absorption path, the water vapor included in the return air RA is absorbed by the absorbing agent. The return air RA that has been dehumidified in this manner passes through the heat exchanger 107 and is cooled by heat exchange with the refrigerant. Thereafter, the return air RA whose moisture and heat have been taken away is expelled to the outdoors as the exhaust air EA.

Meanwhile, the outside air OA taken into the casing flows into the cooling path of the second humidity control element 182. As the outside air OA flows through the cooling path, the absorption heat that arises when the water vapor is absorbed in the absorption path by the absorbing agent is absorbed. The outside air OA whose absorption heat has been taken away passes through the regenerative heat exchanger 105. At this time, in the regenerative heat exchanger 105, the outside air OA is heated by heat exchange with the refrigerant.

The outside air OA that has been heated by the second humidity control element 182 and the regenerative heat exchanger 105 is guided into the absorption path of the first humidity control element 181. In this absorption path, the absorbing agent is heated by the outside air OA, the temperature-sensitive organic polymer material causes a volume phase transition from a swelling phase to a contracting phase, and the water vapor is desorbed from the absorbing agent. In other words, regeneration of the first humidity control element 181 is performed. Then, the water vapor desorbed from the absorbing agent is discharged into the outside air OA and the outside air OA is humidified. The outside air OA humidified by the first humidity control element 181 passes through the heat exchanger 106. At this time, the heat exchanger 106 is halted so that the outside air OA is neither heated nor cooled. Then, the humidified outside air OA is supplied to the indoors as the supply air SA.

Even in the air conditioner 110 shown in FIGS. 13(A) and (B), the first operation and the second operation are switched at a predetermined time interval, so that when capacity control is performed on the basis of the condenser temperature and the condenser pressure of the heat exchanger 105 functioning as a condenser, control that is more appropriate than performing capacity control on the basis of the temperature of the supply air SA and the like is performed.

(4)

Figure 14:
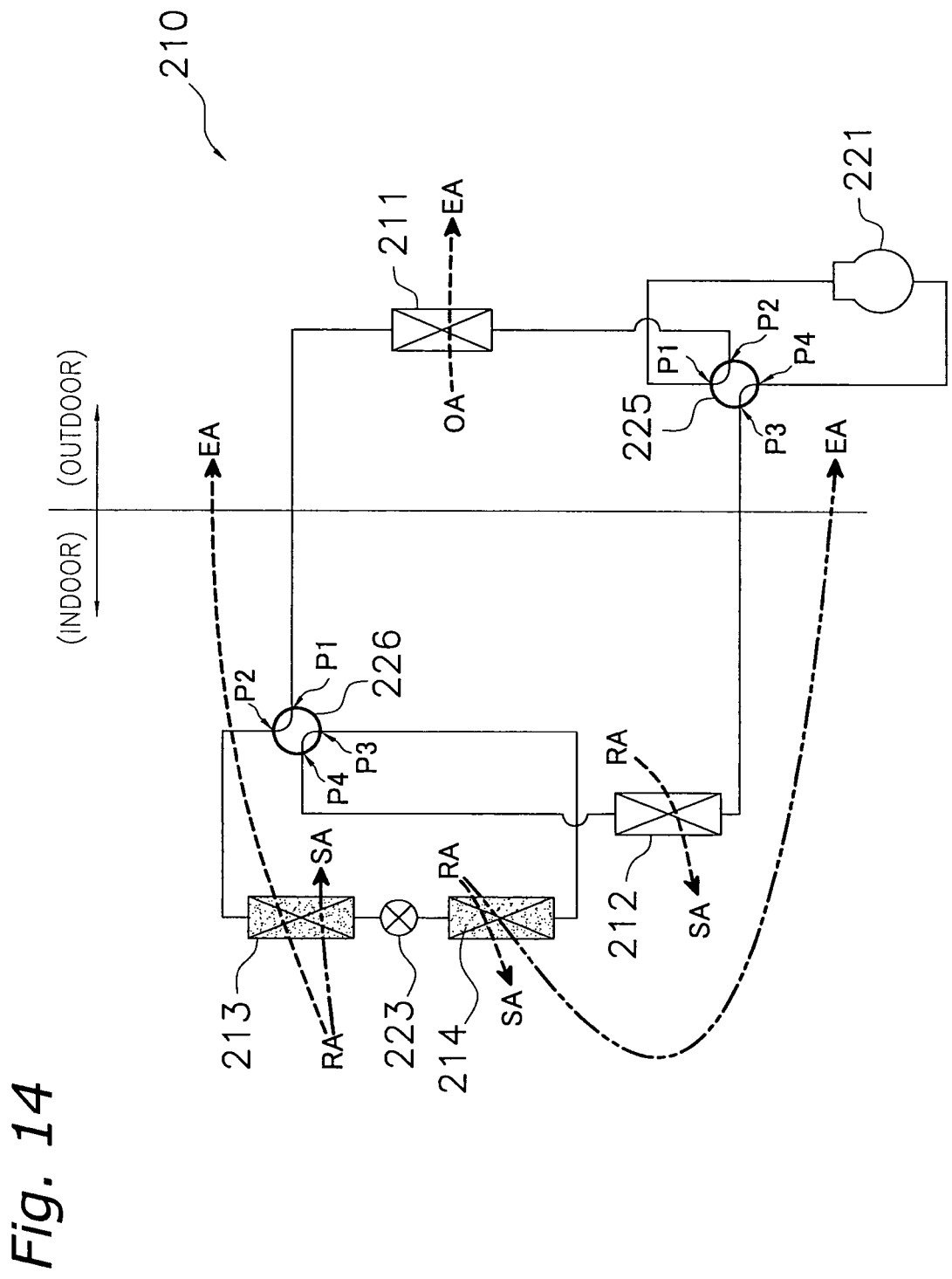
FIG. 14 is a diagram showing the state of a cooling and dehumidifying operation in an air conditioner pertaining to another embodiment (4) of the present invention.

Even in an air conditioner 210 comprising an outdoor heat source heat exchanger 211 and indoor utilization heat exchangers 212, 213, and 214 such as shown in FIG. 14, it is possible to apply the present invention, and effects that are the same as those of the preceding embodiment can be obtained.

The air conditioner 210 shown in FIG. 14 includes, as utilization heat exchangers, a sensible heat heat exchanger 212 that mainly performs sensible heat processing without including the absorbing agent and absorptive heat exchangers 213 and 214 on whose surfaces an absorbing agent is disposed, and includes the outdoor heat exchanger 211 as a heat source heat exchanger. An outlet side of a compressor 221 is connected to a first port P1 of a first four-way switch valve 225, and an inlet side of the compressor 221 is connected to a fourth port P4 of the first four-way switch valve 225. One end of the outdoor heat exchanger 211 is connected to a second port P2 of the first four-way switch valve 225, and the other end of the outdoor heat exchanger 211 is connected to a first port P1 of a second four-way switch valve 226. One end of the sensible heat heat exchanger 212 is connected to a third port P3 of the first four-way switch valve 225, and the other end of the sensible heat heat exchanger 212 is connected to a fourth port P4 of the second four-way switch valve 226. Further, the first absorptive heat exchanger 213, an expansion valve 223, and the second absorptive heat exchanger 214 are disposed in order from the second port P2 to the third port P3 of the second four-way switch valve 226.

The first four-way switch valve 225 switches between a first state, where its first port P1 and its second port P2 are mutually communicated and its third port P3 and its fourth port P4 are mutually communicated (the state shown in FIG. 14), and a second state, where its first port P1 and its third port P3 are mutually communicated and its second port P2 and its fourth port P4 are mutually communicated. The second four-way switch valve 226 switches between a first state, where its first port P1 and its second port P2 are mutually communicated and its third port P3 and its fourth port P4 are mutually communicated (the state shown in FIG. 14), and a second state, where its first port P1 and its third port P3 are mutually communicated and its second port P2 and its fourth port P4 are mutually communicated.

In the air conditioner 210 shown in FIG. 14, a cooling and dehumidifying operation and a heating and humidifying operation are performed, but here, description will be given using the cooling and dehumidifying operation as an example.

During the cooling and dehumidifying operation, the first four-way switch valve 225 is set to the first state shown in FIG. 14, the opening of the expansion valve 223 is appropriately regulated, the outdoor heat exchanger 211 becomes a condenser, and the sensible heat heat exchanger 212 becomes an evaporator. In regard to the first absorptive heat exchanger 213 and the second absorptive heat exchanger 214, a first state, where the first absorptive heat exchanger 213 becomes a condenser and the second absorptive heat exchanger 214 becomes an evaporator, and a second state, where the second absorptive heat exchanger 214 becomes a condenser and the first absorptive heat exchanger 213 becomes an evaporator, are alternately repeated.

Moreover, during the cooling and dehumidifying operation, the outside air OA is supplied to the outdoor heat exchanger 211, and the return air RA from the indoors is supplied to the sensible heat heat exchanger 212 and to the first and second absorptive heat exchangers 213 and 214. Additionally, the return air RA passing through the sensible heat heat exchanger 212 is continuously supplied to the indoors as the supply air SA, and the return air RA passing through the first absorptive heat exchanger 213 and the return air RA passing through the second absorptive heat exchanger 214 are alternately supplied to the indoors as the supply air SA.

In the first state, a regenerating operation in regard to the absorbing agent of the first absorptive heat exchanger 213 and an absorbing operation in regard to the absorbing agent of the second absorptive heat exchanger 214 are performed in parallel. In the first state, the second four-way switch valve 226 is set to the state shown in FIG. 14. In this state, the refrigerant discharged from the compressor 221 is condensed as it passes in order through the outdoor heat exchanger 211 and the first absorptive heat exchanger 213, is depressurized by the expansion valve 223, is thereafter evaporated as it passes in order through the second absorptive heat exchanger 214 and the sensible heat heat exchanger 212, and is taken into and compressed by the compressor 221.

In this first state, the outside air OA that has absorbed heat from the refrigerant in the outdoor heat exchanger 211 is expelled to the outdoors as the exhaust air EA, and the return air RA from the indoors that has been cooled by the sensible heat heat exchanger 212 is sent back to the indoors as the supply air SA. In the first absorptive heat exchanger 213, the moisture is desorbed from the absorbing agent heated by the refrigerant, and this desorbed moisture is imparted to the return air RA. The moisture desorbed from the first absorptive heat exchanger 213 is expelled to the outdoors as the exhaust air EA together with the return air RA (see the flow of the return air RA indicated by the dotted line in FIG. 14). In the second absorptive heat exchanger 214, the moisture in the return air RA from the indoors is absorbed by the absorbing agent, the return air RA is dehumidified, and the absorption heat arising at that time is absorbed by the refrigerant. The return air RA dehumidified by the second absorptive heat exchanger 214 is sent back to the indoors as the supply air SA (see the flow of the return air RA indicated by the dotted line in FIG. 14).

In the second state, an absorbing operation in regard to the absorbing agent of the first absorptive heat exchanger 213 and a regenerating operation in regard to the absorbing agent of the second absorptive heat exchanger 214 are performed in parallel. In the second state, the refrigerant discharged from the compressor 221 is condensed as it passes in order through the outdoor heat exchanger 211 and the second absorptive heat exchanger 214, is depressurized by the expansion valve 223, is thereafter evaporated as it passes in order through the first absorptive heat exchanger 213 and the sensible heat heat exchanger 212, and is taken into and compressed by the compressor 221.

In this second state, similar to the case of the first state, the outside air OA that has absorbed heat from the refrigerant in the outdoor heat exchanger 211 is expelled to the outdoors as the exhaust air EA, and the return air RA from the indoors that has been cooled by the sensible heat heat exchanger 212 is sent back to the indoors as the supply air SA. In the first absorptive heat exchanger 213, the moisture in the return air RA from the indoors is absorbed by the absorbing agent, the return air RA is dehumidified, and the absorption heat arising at that time is absorbed by the absorbing agent. The return air RA from the indoors that has been dehumidified by the first absorptive heat exchanger 213 is sent back to the indoors as the supply air SA (see the flow of the return air RA indicated by the two-dotted chain line in FIG. 14). In the second absorptive heat exchanger 214, the moisture is desorbed from the absorbing agent heated by the refrigerant, and this desorbed moisture is imparted to the return air RA. The moisture desorbed from the second absorptive heat exchanger 214 is discharged to the outdoors as the exhaust air EA together with the return air RA (see the flow of the return air RA indicated by the two-dotted chain line in FIG. 14).

Even in the air conditioner 210 shown in FIG. 14, the first state and the second state are switched at a predetermined time interval, so that when capacity control is performed on the basis of the condenser temperature and the evaporator temperature or the like of the first absorptive heat exchanger 213 and the second absorptive heat exchanger 214 functioning as a condenser or an evaporator, control that is more appropriate than performing capacity control on the basis of the temperature of the supply air SA or the like is performed.

(5)

Figure 15:
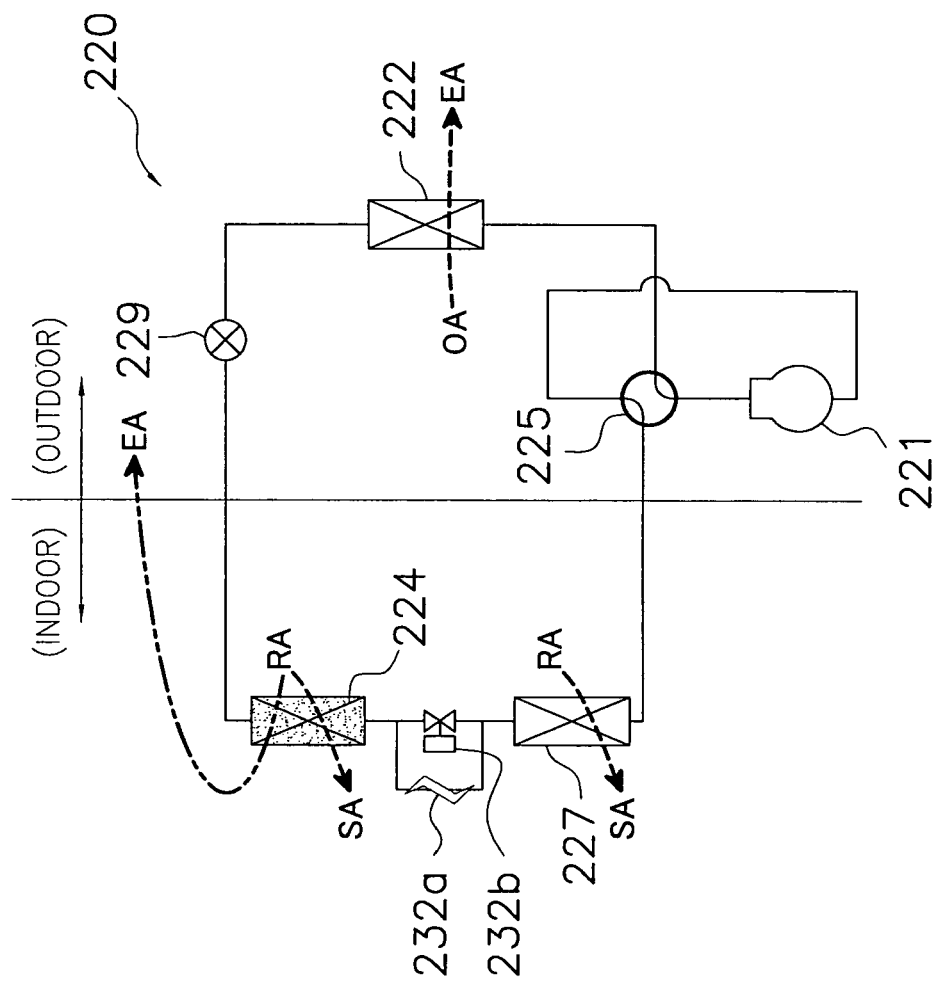
FIG. 15 is a diagram showing the state of a cooling and dehumidifying operation in an air conditioner pertaining to another embodiment (5) of the present invention.

Even in an air conditioner 220 comprising an outdoor heat source heat exchanger 222 and indoor utilization heat exchangers 224 and 227 such as shown in FIG. 15, it is possible to apply the present invention, and effects that are the same as those of the preceding embodiment can be obtained.

The air conditioner 220 shown in FIG. 15 is disposed with an outdoor heat exchanger 222 as a heat source heat exchanger that is outdoors and an absorptive heat exchanger 224, which carries an absorbing agent, and a sensible heat heat exchanger 227, which mainly performs sensible heat processing without including an absorbing agent, that are indoors.

In the air conditioner 220, a cooling and dehumidifying operation and a heating and humidifying operation are performed, but here, description will be given using the cooling and dehumidifying operation as an example.

During the cooling and dehumidifying operation, a four-way switch valve 225 is set to the state shown in FIG. 15 such that the outdoor heat exchanger 222 becomes a condenser and the sensible heat heat exchanger 227 becomes an evaporator. Additionally, an absorbing operation where the absorptive heat exchanger 224 becomes an evaporator and a regenerating operation where the absorptive heat exchanger 224 becomes a condenser are alternately repeated by the control of an electromagnetic valve 232b and an expansion valve 229. Moreover, during the cooling and dehumidifying operation, the outside air OA is supplied to the outdoor heat exchanger 222, and the return air RA from the indoors is supplied to the sensible heat heat exchanger 227 and the absorptive heat exchanger 224. Additionally, the return air RA that has been cooled by the sensible heat heat exchanger 227 is continuously supplied to the indoors, and the return air RA that has been dehumidified by the absorptive heat exchanger 224 is intermittently supplied to the indoors as the supply air SA.

During the absorbing operation, the electromagnetic valve 232b is opened and the opening of the expansion valve 229 is appropriately regulated. In this state, the refrigerant discharged from the compressor 221 is condensed by the outdoor heat exchanger 222, is then depressurized by the expansion valve 229, is then evaporated as it passes in order through the absorptive heat exchanger 224 and the sensible heat heat exchanger 227, and is taken into and compressed by the compressor 221.

During this absorbing operation, the outside air OA that has absorbed heat from the refrigerant in the outdoor heat exchanger 222 is expelled to the outdoors as the exhaust air EA, and the return air RA from the indoors that has been cooled by the sensible heat heat exchanger 227 is sent back to the indoors as the supply air SA. Further, in the absorptive heat exchanger 224, the moisture in the return air RA from the indoors is absorbed by the absorbing agent, the return air RA is dehumidified, and the absorption heat arising at that time is absorbed by the refrigerant. The return air RA from the indoors that has been dehumidified by the absorptive heat exchanger 224 is sent back to the indoors as the supply air SA.

During the regenerating operation, the electromagnetic valve 232b is closed and the expansion valve 229 is completely opened. In this state, the refrigerant discharged from the compressor 221 is condensed as it passes in order through the outdoor heat exchanger 222 and the absorptive heat exchanger 224, is thereafter depressurized by a capillary tube 232a, is evaporated by the sensible heat heat exchanger 227, and is taken into and compressed by the compressor 221.

During this regenerating operation, the outside air OA that has absorbed heat from the refrigerant in the outdoor heat exchanger 222 is expelled to the outdoors as the exhaust air EA, and the return air RA from the indoors that has been cooled by the sensible heat heat exchanger 227 is sent back to the indoors as the supply air SA. Further, in the absorptive heat exchanger 224, the absorbing agent is heated by the refrigerant and regenerated, and the moisture desorbed from the absorbing agent is imparted to the return air RA from the indoors. The moisture desorbed from the absorptive heat exchanger 224 is expelled to the outdoors as the exhaust air EA together with the return air RA from the indoors (see the flow of the return air RA indicated by the two-dotted chain line in FIG. 15).

Even in the air conditioner 220 shown in FIG. 15, the absorbing operation and the regenerating operation of the absorptive heat exchanger 224 are switched at a predetermined time interval, so that when capacity control is performed on the basis of the condenser temperature and the evaporator temperature or the like of the absorptive heat exchanger 224 functioning as a condenser or an evaporator, control that is more appropriate than performing capacity control on the basis of the temperature of the supply air SA or the like is performed.

(6)

In the preceding embodiment, the input unit 2a such as a DIP switch that allows input by a user or a maintenance person is disposed, and the controller 2 performs control of the capacity of the inverter compressor 7 and control of the batch switching time interval such that the load (latent heat load, sensible heat load, or total heat load) inputted to the input unit 2a is preferentially processed. In this case, the load that a user has selected (inputted) is preferentially processed, and an air-conditioned environment that is more suited to the liking of the user can be obtained.

Rather than allowing a user to input the load that is to be preferentially processed in this manner, the air conditioner can also be configured such that the controller 2 automatically determines the load that is to be preferentially processed.

For example, the controller 2 can decide, on the basis of a first difference, a second difference, and a third difference, the load that is to be preferentially processed. The first difference is the difference between the current capability of the air conditioner 10 to process the total heat load and the size of the total heat load in the room. The second difference is the difference between the current capability to process the latent heat load and the size of the latent heat load in the room. The third difference is the difference between the current capability to process the sensible heat load and the size of the sensible heat load in the room. Specifically, the controller 2 selects the difference having the largest value out of the first difference, the second difference, and the third difference. When the difference having the largest value is the first difference, the controller 2 decides that the total heat load is the load to be preferentially processed. When the difference having the largest value is the second difference, the controller 2 decides that the latent heat load is the load to be preferentially processed. When the difference having the largest value is the third difference, the controller 2 decides that the sensible heat load is the load to be preferentially processed. The controller 2 can judge the size of each load and the current capability to process each load from acquired data such as various kinds of air temperatures and refrigerant state information (temperature and pressure).

In this manner, by configuring the air conditioner such that the controller 2 automatically determines the load that is to be preferentially processed, the controller 2 becomes able to perform processing of the total heat load, the latent heat load, and the sensible heat load with good balance.

(7)

In the preceding embodiment, when the load to be preferentially processed is the latent heat load, the controller 2 prioritizes, over changing the throughput of the latent heat load by controlling the capacity of the inverter compressor 7, changing the throughput of the latent heat load by performing control for changing the batch switching time interval.

Instead of this capability control, when the load to be preferentially processed is the latent heat load, it is also conceivable for the controller 2 to prioritize, over changing the throughput of the latent heat load by performing control for changing the batch switching time interval, changing the throughput of the latent heat load by controlling the capacity of the inverter compressor 7. Here, when the latent heat load is to be preferentially processed, the controller 2 first performs control of the capacity of the inverter compressor 7 to change the throughput of the latent heat load, and when that does not suffice, the controller 2 performs control for changing the batch switching time interval to further change the throughput of the latent heat load. By performing capability control in this manner, changes in the throughput of the latent heat load appear relatively faster because the controller 2 first performs control of the capacity of the inverter compressor 7, and necessary processing of the latent heat load is quickly achieved.

(8)

In the preceding embodiment, when the load to be preferentially processed is the sensible heat load, the controller 2 prioritizes, over changing the throughput of the sensible heat load by controlling the capacity of the inverter compressor 7, changing the throughput of the sensible heat load by performing control for changing the batch switching time interval.

Instead of this capability control, when the load to be preferentially processed is the sensible heat load, it is also conceivable for the controller 2 to prioritize, over changing the throughput of the sensible heat load by performing control for changing the batch switching time intervals, changing the throughput of the sensible heat load by controlling the capacity of the inverter compressor 7. Here, when the sensible heat load is to be preferentially processed, the controller 2 first performs control of the capacity of the inverter compressor 7 to change the throughput of the sensible heat load, and when that does not suffice, the controller 2 performs control for changing the batch switching time interval to further change the throughput of the sensible heat load. By performing capability control in this manner, changes in the throughput of the sensible heat load appear relatively faster because the controller 2 first performs control of the capacity of the inverter compressor 7, and necessary processing of the sensible heat load is quickly achieved.

(9)

In the preceding embodiment, when the load to be preferentially processed is the total heat load, the controller 2 first fixes the sensible/latent heat throughput ratio, which is the ratio of the throughput of the latent heat load to the throughput of the sensible heat load, by controlling the batch switching time interval, and thereafter performs control of the capacity of the inverter compressor 7.

Instead of this capability control, when the load to be preferentially processed is the total heat load, it is also conceivable for the controller 2 to first perform control of the capacity of the inverter compressor 7.

When the total heat load is to be increased/decreased, it is effective to change the capacity of the inverter compressor 7, so here, when the total heat load must be preferentially processed, the controller 2 first performs control of the capacity of the inverter compressor 7 before performing control of the batch switching time interval. Thus, the throughput of the total heat load is quickly increased/decreased, and it becomes possible for changes in the total heat load to be quickly accommodated.

INDUSTRIAL APPLICABILITY

According to the present invention, in an air conditioner where switching between an absorbing operation and a regenerating operation by an absorbing agent is performed, control of the capacity of a compressor and control for changing switching time intervals is performed such that a predetermined load out of a total heat load, a latent heat load, and a sensible heat load is preferentially processed. For this reason, it is easy for the air conditioner to perform appropriate capability control, and the air conditioner is useful as an air conditioner that processes a latent heat load and a sensible heat load in a room.

What is claimed is:

1. An air conditioner that processes a latent heat load and a sensible heat load by using a vapor compression refrigeration cycle with a compressor, the air conditioner comprising:
a heat exchanger;
an absorbing agent that performs an absorbing operation for absorbing moisture in passing air flowing through the heat exchanger functioning as an evaporator and a regenerating operation for desorbing moisture from passing air heated by the heat exchanger functioning as a condenser; and
a controller configured to switch the absorbing operation and the regenerating operation at a predetermined switching time interval,
the controller being configured to control a capacity of the compressor and being configured to control the predetermined switching time interval such that a predetermined load out of a total heat load, which is the sum of the latent heat load and the sensible heat load, is preferentially processed.

2. The air conditioner of claim 1, further comprising an input unit that allows a user to select the predetermined load.

3. The air conditioner of claim 1, wherein
the controller is configured to determine a first difference that is a difference between the current capability to process the total heat load and the size of the total heat load, a second difference that is a difference between the current capability to process the latent heat load and the size of the latent heat load, and a third difference that is a difference between the current capability to process the sensible heat load and the size of the sensible heat load, and to determine the predetermined load on the basis of the first, second, and third differences.

4. The air conditioner of claim 1, wherein
the controller is configured to prioritize changing a throughput of the latent heat load by controlling the capacity of the compressor over changing a throughput of the latent heat load by controlling the changing of the predetermined switching time interval when the predetermined load is the latent heat load.

5. The air conditioner of claim 1, wherein
the controller is configured to prioritize changing a throughput of the latent heat load by controlling the changing of the predetermined switching time interval over changing a throughput of the latent heat load by controlling the capacity of the compressor when the predetermined load is the latent heat load.

6. The air conditioner of claim 1, wherein
the controller is configured to prioritize changing a throughput of the sensible heat load by controlling the capacity of the compressor over changing a throughput of the sensible heat load by controlling the changing of the predetermined switching time interval when the predetermined load is the sensible heat load.

7. The air conditioner of claim 1, wherein
the controller is configured to prioritize changing a throughput of the sensible heat load by controlling the changing of the predetermined switching time interval over changing a throughput of the sensible heat load by controlling the capacity of the compressor when the predetermined load is the sensible heat load.

8. The air conditioner of claim 1, wherein
the controller first performs control of the capacity of the compressor when the predetermined load is the total heat load.

9. The air conditioner of claim 1, wherein
the controller first fixes a ratio of the throughput of the latent heat load to the throughput of the sensible heat load by controlling the predetermined switching time interval and thereafter performs control of the capacity of the compressor when the predetermined load is the total heat load.

10. The air conditioner of claim 1, wherein
the heat exchanger includes a first absorptive heat exchanger and a second absorptive heat exchanger, the absorbing agent is disposed on a surface of each of the first and second absorptive heat exchangers, and
the controller switches between a first state where the air conditioner supplies to the room air that has been dehumidified or humidified by the absorbing operation or the regenerating operation by the absorbing agent of the first absorptive heat exchanger and a second state where the air conditioner supplies to the room air that has been dehumidified or humidified by the absorbing operation or the regenerating operation by the absorbing agent of the second absorptive heat exchanger.

11. The air conditioner of claim 1, wherein
the heat exchanger includes a utilization heat exchanger and a heat source heat exchanger.

12. The air conditioner of claim 1, wherein
the controller performs the control of the capacity of the compressor and the control for changing the switching time interval on the basis of at least one of the temperature of the evaporator, the pressure of the evaporator, the temperature of the condenser, and the pressure of the condenser.

13. A method of controlling an air conditioner comprising:
processing a latent heat load and a sensible heat load in a room by using a vapor compression refrigeration cycle with a compressor and a heat exchanger;
utilizing an absorbing agent that performs an absorbing operation for absorbing moisture in passing air flowing through the heat exchanger functioning as an evaporator and a regenerating operation for desorbing moisture from passing air heated by the heat exchanger functioning as a condenser;
performing control such that the absorbing operation and the regenerating operation are switched at a predetermined switching time interval; and
controlling a capacity of the compressor and controlling the predetermined switching time interval such that a predetermined load out of a total heat load, which is the sum of the latent heat load and the sensible heat load, is preferentially processed.

* * * * *